(12) United States Patent
Bruce et al.

(10) Patent No.: US 9,394,780 B2
(45) Date of Patent: Jul. 19, 2016

(54) SOLAR HEATING FOR SITE LOCATED OIL STORAGE OR SEPARATION

(71) Applicants: Wallace Bruce, Pampa, TX (US);
Richard Chacon, Bloomfield, NM (US);
Mark Ray, Pagosa Springs, CO (US)

(72) Inventors: Wallace Bruce, Pampa, TX (US);
Richard Chacon, Bloomfield, NM (US);
Mark Ray, Pagosa Springs, CO (US)

(73) Assignee: Industrial Solar Heating Systems, LLC, Pampa, TX (US)

( * ) Notice: Subject to any disclaimer, the term of this patent is extended or adjusted under 35 U.S.C. 154(b) by 199 days.

(21) Appl. No.: 13/775,899

(22) Filed: Feb. 25, 2013

(65) Prior Publication Data

US 2013/0223826 A1     Aug. 29, 2013

Related U.S. Application Data

(63) Continuation-in-part of application No. 13/325,743, filed on Dec. 14, 2011, now Pat. No. 9,249,650.

(60) Provisional application No. 61/423,367, filed on Dec. 15, 2010, provisional application No. 61/602,305, filed on Feb. 23, 2012.

(51) Int. Cl.
| | |
|---|---|
| *E21B 43/34* | (2006.01) |
| *F24H 9/00* | (2006.01) |
| *F24H 1/20* | (2006.01) |
| *B01D 17/04* | (2006.01) |
| *F24J 2/05* | (2006.01) |
| *F24J 2/42* | (2006.01) |

(Continued)

(52) U.S. Cl.
CPC ............. *E21B 43/34* (2013.01); *B01D 17/042* (2013.01); *F24H 1/208* (2013.01); *F24H 9/00* (2013.01); *F24J 2/055* (2013.01); *F24J 2/42* (2013.01); *F24J 2/44* (2013.01); *F24J 2/4625* (2013.01); *F24J 2/541* (2013.01); *F24J 2/5406* (2013.01); *F28D 1/0213* (2013.01); *F28D 7/026* (2013.01); *F28D 7/06* (2013.01); *F28D 7/106* (2013.01); *F28D 20/0034* (2013.01); *F28D 20/0052* (2013.01); *F28D 20/0056* (2013.01); *F28F 27/02* (2013.01); *F28D 2021/0059* (2013.01); *Y02E 10/44* (2013.01); *Y02E 10/47* (2013.01); *Y02E 60/142* (2013.01); *Y02E 70/30* (2013.01)

(58) Field of Classification Search
CPC ...... Y02E 10/44; E21B 43/24; E21B 43/2401; E21B 36/04; E21B 36/00; E21B 3/34; E21B 43/40; Y02B 10/20; Y02B 40/74; F24J 2/4647; F24H 9/2021; F24H 9/00; F24H 1/208
USPC ......... 166/57, 302, 267, 75.12; 392/441, 447, 392/451, 461; 126/573, 600, 634, 651
See application file for complete search history.

(56) References Cited

U.S. PATENT DOCUMENTS

| | | | |
|---|---|---|---|
| 3,960,322 A * | 6/1976 | Ruff et al. .................. | 62/228.1 |
| 4,108,160 A | 8/1978 | Harper | |

(Continued)

*Primary Examiner* — Blake Michener
*Assistant Examiner* — Wei Wang
(74) *Attorney, Agent, or Firm* — Jackson Walker, LLP

(57) ABSTRACT

A system for providing supplemental or auxiliary heat to a crude oil separator is provided. The system includes a primary circuit carrying a fluid heated by a solar panel and a secondary circuit carrying a fluid heated by heat exchangers engaged with the primary circuit. The secondary circuit includes heat exchangers engaging the separator to provide auxiliary heat. The system may also include a source of off-grid electrical energy, such as a wind turbine and/or photoelectric cell.

6 Claims, 40 Drawing Sheets

(51) Int. Cl.

| | |
|---|---|
| *F24J 2/44* | (2006.01) |
| *F24J 2/46* | (2006.01) |
| *F24J 2/54* | (2006.01) |
| *F28F 27/02* | (2006.01) |
| *F28D 7/02* | (2006.01) |
| *F28D 7/06* | (2006.01) |
| *F28D 7/10* | (2006.01) |
| *F28D 20/00* | (2006.01) |
| *F28D 1/02* | (2006.01) |
| *F28D 21/00* | (2006.01) |

(56) References Cited

U.S. PATENT DOCUMENTS

| | | | | |
|---|---|---|---|---|
| 4,143,814 | A * | 3/1979 | Hill, Jr. | 126/610 |
| 4,153,104 | A * | 5/1979 | Ruder | 165/48.2 |
| 4,174,752 | A | 11/1979 | Slater | |
| 4,289,204 | A | 9/1981 | Stewart | |
| 4,651,539 | A | 3/1987 | Coloka | |
| 5,002,657 | A | 3/1991 | Botts | |
| 8,701,773 | B2 * | 4/2014 | O'Donnell et al. | 166/303 |
| 2011/0005580 | A1 | 1/2011 | Vandermeulen | |
| 2011/0247831 | A1 | 10/2011 | Smith | |
| 2013/0312411 | A1 * | 11/2013 | Newman | 60/641.8 |

* cited by examiner

VERTICAL TYPE F TREATER

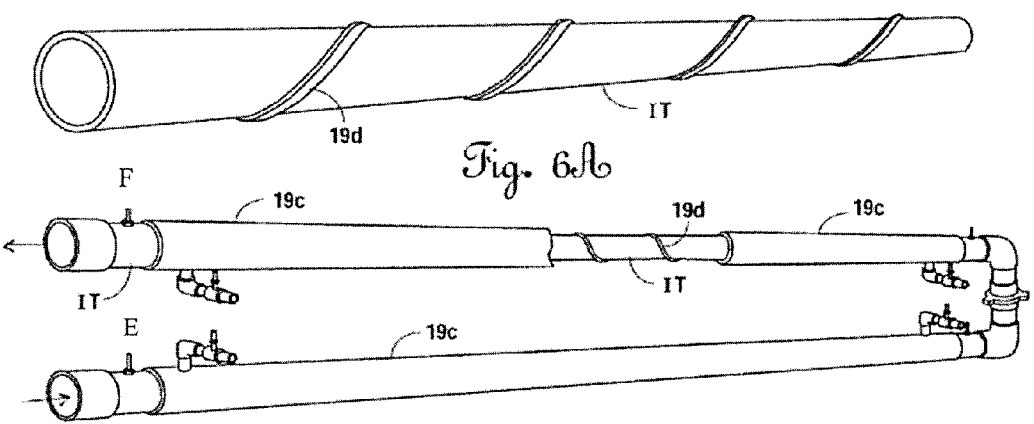
Fig. 6A
Fig. 6B
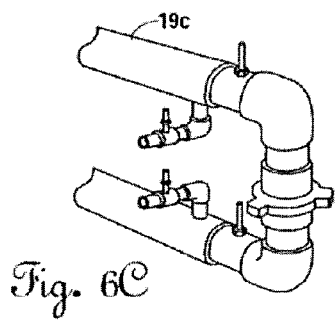
Fig. 6C

With Heater Treater Retrofit modified fire tube

Modified Fire Tube Heat Exchanger

FIBERGLASS SEPARATOR

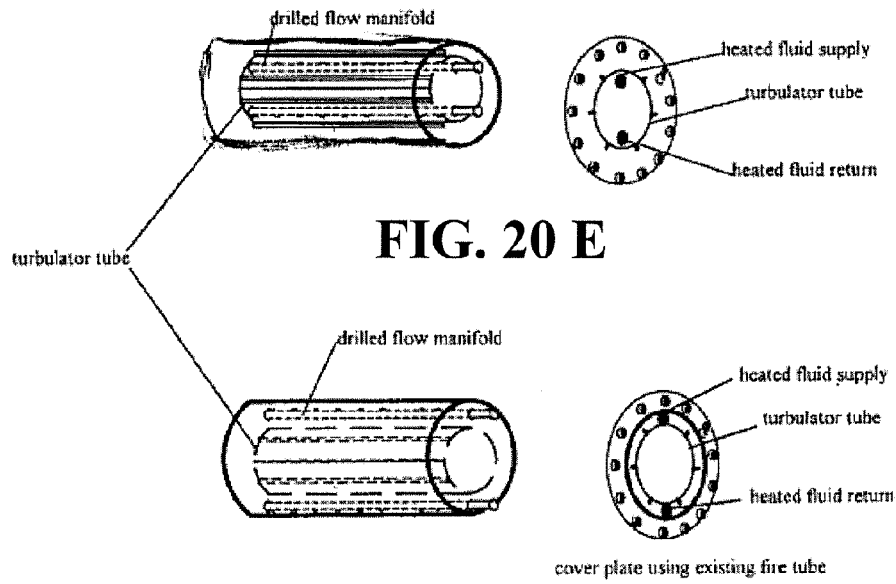
FIG. 20 E
Fig 20 D
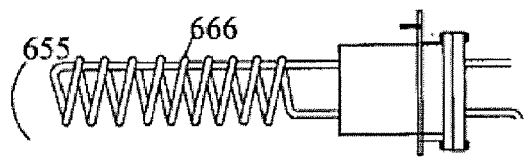
Fig 20 C
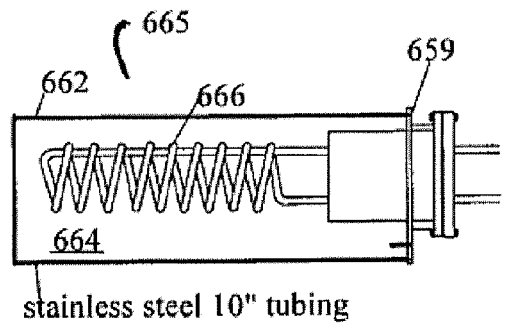
Fig. 20 B

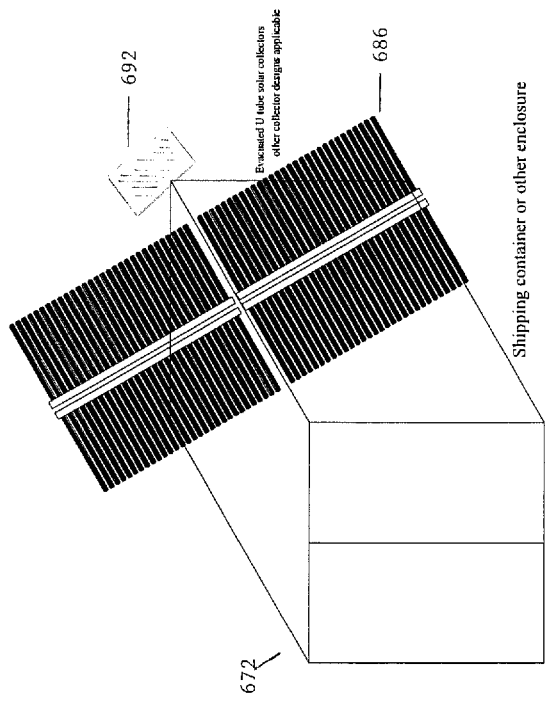
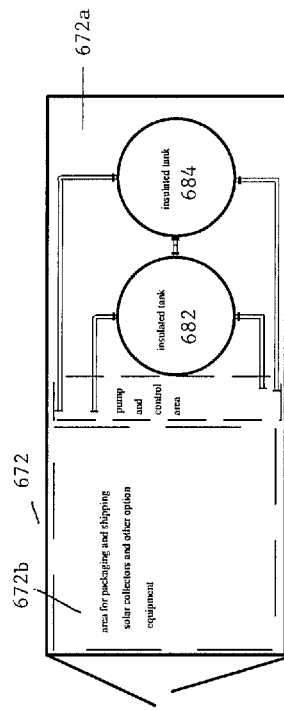
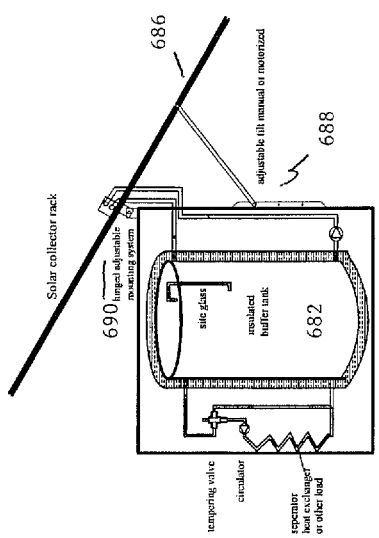
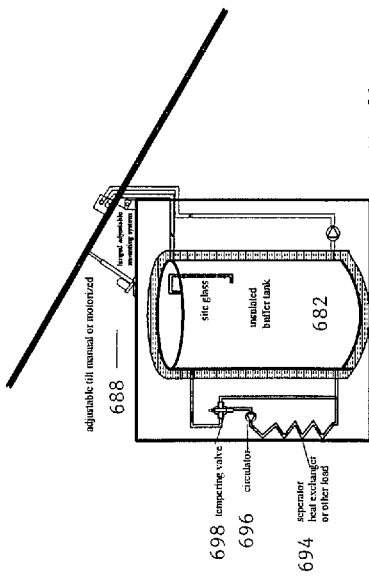
FIG. 21 B — Pre packaged solar thermal unit
FIG. 21 C — Plan view dual tank option in a shipping container
FIG. 21 D
FIG. 21 E

SOLAR HEATING FOR SITE LOCATED OIL STORAGE OR SEPARATION

This application claims priority from and the benefit of provisional patent application Ser. No. 61/602,305 filed Feb. 23, 2012, and incorporates the same by reference herein. This application is a continuation-in-part application and claims priority from co-pending U.S. patent application Ser. No. 13/325,743, filed Dec. 14, 2011, which claims the benefit of U.S. Provisional Application Ser. No. 61/423,367, filed Dec. 15, 2010.

FIELD OF THE INVENTION

Solar energy to enhance oil and gas site location separator recovery and reduce pollution emission from conventional natural gas powered separators.

BACKGROUND OF THE INVENTION

This application incorporates by reference U.S. patent application Ser. No. 13/325,743, filed Dec. 14, 2011, entitled "Clean Solar Energy to Enhance Oil and Gas Location Separator Recovery."

Product coming out of the ground typically contains oil, but the oil is part of an emulsification comprising oil, dissolved gas, water, and other miscellaneous ingredients. The well owners typically desire transporting only the oil and gas components of the mix for further remote processing, such as at a refinery. It is generally more efficient to remove the oil and gas components from the emulsification or product at the site of the wellhead, and sell the separated oil and gas.

Currently, there are several methods used for the purpose of heating and separating oil, gas, and BS&W (a mixture of debris or basic sediment and water found in the product). The equipment used in this process typically burns natural gas.

Three-phase high pressure gas separators, such as seen in FIGS. 1 and 2 (prior art), are sometimes used. These burn natural gas in a fire tube and typically use fresh water or other suitable fluid as a heat exchange medium between the fire tube and a coil bearing product which is passed over the fire tube and immersed in the fresh water. This three-phase high pressure separator typically is employed at the wellhead site and separates the product received from the wellhead typically as an emulsion into produced water which may be drained off or re-injected, produced oil which may be removed or stored for further processing and sale, and produced gas which may be sold (see prior art FIGS. 1 and 2).

Heater Treaters are also known as low pressure separators and are illustrated in FIGS. 3, 4, and 4A (prior art). Here natural gas fuels a fire box at the base of a vertical column containing product. The dense water settles at the bottom and is drawn off, the gas moving upward in the column is driven out of a stack near the top of the heated inner column (see FIGS. 3, 4, and 4A). FIG. 3 shows a photograph of an in-line heater onsite somewhere in Texas, in conjunction with a water knockout system separator and Heater Treater. FIG. 4 is an illustration of a typical Heater Treater.

There are a number of disadvantages to the current separation methods. These include high fuel cost. Companies spend millions of dollars to separate the product with conventional methods. This also wastes natural resources wherein large volumes of natural gas are burned to keep the fluids heated in the separation vessel. There are also harmful emissions associated with the prior art historical methods of site location separators, including burning gas producing carbon emissions into the earth's atmosphere. Finally, there are safety concerns in that the flame to burn the natural gas may be dangerous and has in the past created conflagrations at the wellhead site, fueled by the product itself.

SUMMARY OF THE INVENTION

Applicants provide an efficient solar powered heater unit with, optionally, wind generation and photovoltaic cells to assist in heating a crude oil product containing oil and gas separator somewhere near the well or wells. Applicants' efficient treating of recovered oil and gas includes in one embodiment a system for heating a product bearing tube, typically containing oil, gas, and basic sediment and water (BS&W) from a wellhead. In another embodiment of Applicants' system, solar power is used to heat a fluid for circulating into an existing separator.

Applicants provide an enhanced separator system to heat the wellhead product which may then be separated in known ways, with or without the use of natural gas. If a prior art natural gas fired separator is used in conjunction with Applicants' enhanced separator system less natural gas is consumed as the wellhead product is pre-heated.

Such a system of using safe, "green" solar heat to increase the temperature of the oil and gas before or after it goes into a gas-fired separator will help eliminate concerns for emissions into the atmosphere as it will reduce and/or eliminate the use of natural gas. Further, it will reduce vapor generation in the separator as the fire tube use will be reduced.

Applicants provide an enhanced, retrofittable separator system which includes a primary heating circuit and a secondary heating circuit. The primary heating circuit includes elements for converting solar energy to thermal energy and for circulating the thermal energy to heating coils, which heating coils engage the secondary circuit. The primary circuit circulates a primary fluid. The secondary circuit circulates a secondary fluid between one or more large heat buffer tanks and an oil heat exchanger or an existing separator that uses the secondary fluid as a heat exchange medium. The heat buffer tank is heated by the primary or first fluid flowing through heating coils immersed in the buffer heating tank of the secondary heating circuit. The buffer tank is large enough to store heat in the secondary fluid in times when the primary circuit does not provide sufficient heat (prolonged periods of cloudiness, for example).

A first pump drives a first or primary fluid through the primary circuit and a second pump drives a second fluid through the secondary heating circuit. The two pumps are controlled by sensors in a microprocessor circuit which controls the heat transfer from the solar collectors to the buffer tank and the buffer tank to the oil heat exchanger.

A system, device, method and kit is provided for preventing waste and increasing the efficiency of oil and gas separator recovery. The system includes a separator having an oil bearing tube, the tube having an inlet and an outlet. The system comprises a primary heating circuit having a primary or first fluid, and a secondary heating circuit, including a heat exchange or buffer tank having a second fluid therein. The heat exchange or buffer tank has a second temperature sensor engaged therewith. The primary heating circuit includes a solar heater having of first fluid therein for receiving radiant heat from the sun. The solar heater has an inlet and an outlet, and a remote heating coil means for removing heat from the first fluid. The remote heating coil means is adapted to engage the heat exchange tank of the secondary heating circuit. A first fluid flow pathway is provided for circulating the first fluid between the solar heater and the heating coil means. A first fluid pump is provided for moving the first fluid through the flow pathways of the primary heating circuit. A second fluid flow pathway includes temperature flow control means engaged with the first fluid flow pathway near the outlet of the solar heater for diverting at least some of the first fluid from the first fluid flow pathway to the second fluid pathway when the temperature of the first fluid near the outlet of the solar heater exceeds a first preselected temperature (for example, about 195° F.). A heat dissipater engaging the second fluid flow pathway is provided for removing at least some of the heat from the first fluid. A first fluid pump control system controls the operation of the first fluid pump, the first fluid pump control system typically comprising of a first temperature sensor near the outlet of the solar heater and a second temperature sensor in the heat exchange tank. The first fluid pump control system further includes means adapted to measure a delta T, or difference in temperature between the two sensors, and means for energizing the first fluid pump when the delta T exceeds a preselected temperature difference value. A third fluid flow pathway engages the first fluid flow pathway, the third fluid flow pathway includes a valve responsive to the second temperature sensor such that when the second temperature sensor reaches a preselected temperature, the valve allows at least some of the first fluid to bypass the remote heating coil means and return the first fluid to the first fluid circuit. The secondary heating circuit is adapted to receive heat from the remote heat exchange coil means of the primary heating circuit and heat the oil in the tube. The secondary circuit includes the heat exchange or buffer tank. The heat exchange or buffer tank has an inlet and an outlet with a secondary fluid flow pathway adapted to place the second fluid in contact with the oil tube so as to heat the oil therein. The secondary fluid flow pathway is configured to engage the inlet and outlet with the heat exchange tank. A pump, engaging the secondary fluid flow pathway is provided for moving the second fluid between the inlet and the outlet. A bypass fluid flow pathway is provided fluidly engaged with the secondary flow pathway, the bypass fluid flow pathway including a temperature responsive valve for diverting at least some of the second fluid such that it bypasses the heat exchange tank.

BRIEF DESCRIPTION OF THE DRAWINGS

FIGS. 6A, 6B, and 6C are illustrations of elements of Applicant's novel tube-in-tube oil heat exchanger with a turbulator.

FIGS. 20B and 20C illustrate assemblies for transferring heat from Applicant's secondary circuit to the interior of a fiberglass heater treater in side elevational views (tertiary circuit).

FIGS. 20D and 20E illustrate a perspective exploded view of an alternate assembly for providing heat to the interior of a heater treater from the secondary circuit.

DETAILED DESCRIPTION OF THE PREFERRED EMBODIMENT

Figure 5:
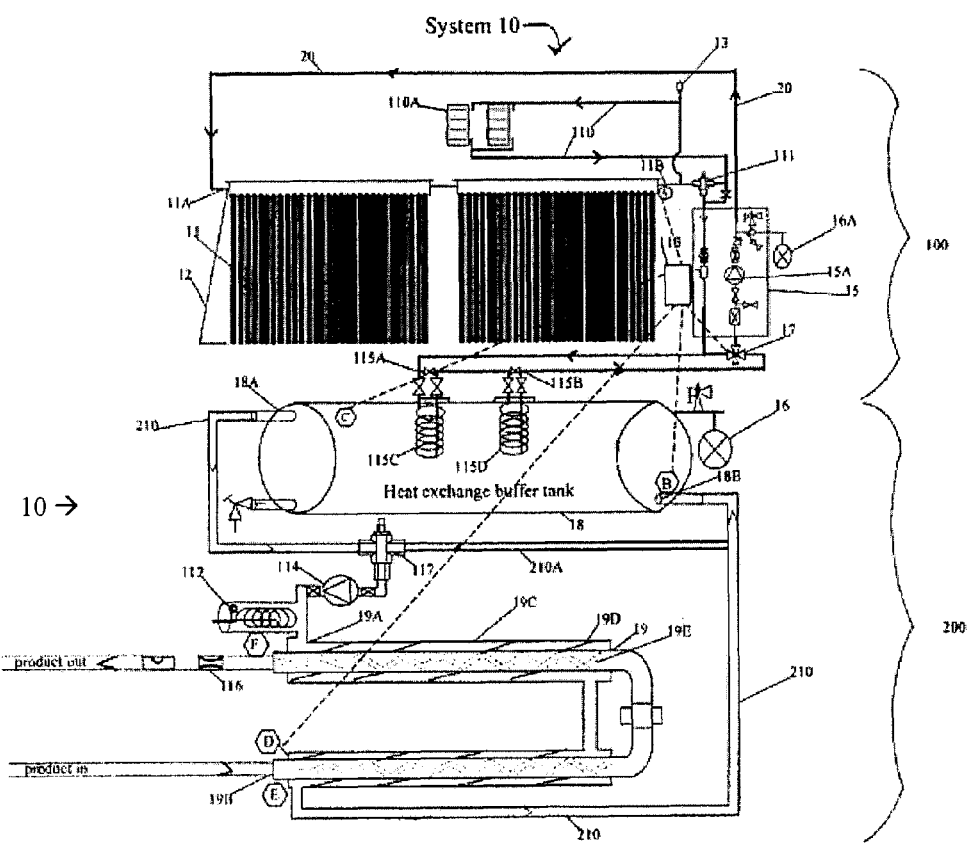
FIG. 5 is an illustration of Applicant's novel enhanced separator system showing the major components thereof.

Turning to FIG. 5, an enhanced separator system 10 is provided for preventing waste. The system 10 in one embodiment includes an oil heat exchanger 19 having an oil bearing inner tube IT for use in conjunction with an existing, typically prior art separator.

A primary heating circuit 100 is disclosed. The primary heating circuit 100 includes a solar collector 11 (having one or more panels) mounted on a solar collector frame 12. A primary or first fluid FF (such as water, a synthetic heat transfer fluid, such as Syntherm A-32 or glycol) in the primary heating circuit 100 receives radiant heat from the sun at the solar collector 11. The solar collector 11 has an inlet 11A and an outlet 11B. A heating coil means, which may be a solar heat exchanger 115C/115D, transfer heat from the first fluid FF to the second fluid SF found in buffer tank 18. The remote heating coil means 115C/115D is immersed in a heat exchange buffer tank 18, which contains a secondary or second fluid SF, for example glycol or a synthetic oil. The function of the primary heating circuit is to provide heat to the SF in the heat exchange buffer tank 18. While two remote heating coils are shown, more could be used as needed. Further, more than one buffer tank may be used.

A first fluid flow pathway 20 consists of an out and return circuit between the solar collector 11 and the heat exchange buffer tank 18 which circulates the first fluid FF between the solar collector 11 and the remote solar heat exchanger 115C/115D. The heat exchange buffer tank 18 may be cylindrical. In one embodiment, the heat exchange buffer tank is cylindrical, 24 inches high, 10 feet long, and made of ⅜ inch steel (see FIG. 7A). A first fluid pump 15A moves the first fluid FF through the flow pathways of the primary heating circuit 100. A suitable pressure relief valve may optionally be included in the primary heating circuit.

A second fluid flow pathway 110 comprises a heat dissipation fluid flow pathway engaging a heat dissipater 110A, including temperature responsive flow control means, such as a Tempmatix® solar tempering (proportional) valve 111 engaged with the first fluid flow pathway 20 typically near the outlet 11B of the solar collector 11. Valve 111 is for diverting at least some of the first fluid FF from the first fluid flow pathway 20 to the second fluid pathway 110 when the temperature of the first fluid FF near the outlet 11b of the solar collector 11 exceeds a first preselected temperature (for example, about 195° F.). Heat dissipater 110A engages the second fluid flow pathway 110 and removes at least some of the heat from the first fluid FF when an over temp condition occurs near the outlet 11B of the solar collector.

A first fluid pump module 15 controls the operation of and includes the first fluid pump 15a. The first fluid pump module 15 comprises the first temperature sensor A near the outlet 11b of the solar collector 11 and the second temperature sensor B in the heat exchange buffer tank 18. The first fluid pump module 15 further comprising means, such as multiple differential temperature control 113, adapted to measure the delta T, or difference in temperature between the two sensors A and B. Energizing the first fluid pump 15A is provided when the delta T exceeds a preselected temperature difference value (example 12-18° F.) and the sensor at the solar panel is hotter.

A three-way motorized electronic valve 17 is responsive to the second temperature sensor B such that when the second temperature sensor reaches a preselected temperature (example 210° F.), the valve allows some or all of the first fluid to bypass the heat exchangers 115C/115D through the solar collector 11 and the heat dissipater 110A. This helps avoid an over temp condition in the buffer tank 18.

A secondary heating circuit 200 includes the heat exchange tank 18 having the second fluid SF therein, the heat exchange tank 18 has a second temperature sensor B and a third temperature sensor C engaged therewith. The second sensor B is placed near the coolest point of the exchange tank 18, typically near inlet 18B, and the third sensor C is placed near the outlet 18A near one of the hottest parts of the heat exchange buffer tank 18.

The secondary heating circuit 200 is adapted to receive heat from heat exchange coils 115A/115B of the primary heating circuit 100 and heat the product in the tube IT of the oil heat exchanger 19 (or to assist in warming a working heat transfer fluid of an existing separator as set forth in more detail below). The secondary heating circuit 200 includes the heat exchange buffer tank 18. The heat exchange buffer tank 18 has inlet 18B and outlet 18A for carrying SF to the oil heat exchanger 19 (or other inlets and outlets as set forth below).

A secondary fluid flow pathway 210 engaging the heat exchange buffer tank 18 is adapted to place the second fluid SF in contact with oil heat exchanger 19 so as to heat the product in the inner tube IT. The secondary fluid flow pathway 210 engages inlet 18B and outlet 18A with the oil heat exchange D.

FIG. 5 illustrates a secondary fluid flow pathway in conjunction with heat exchanger 19 so as to heat the product in the inner tube IT before the product gets to the existing separator. In other words, the secondary fluid flow pathway is used to preheat the crude oil product before it reaches the separator. However, Applicants' secondary fluid flow pathway can operate and function to reduce the use of natural gas by the separator in other ways. For example, in FIG. 10B below, Applicants' secondary fluid flow pathway utilizes heat exchangers wrapped on the outside of the prior art or existing heater treater housing, so as to indirectly (through the exterior walls of the heater treater) heat the fluid contents thereof. In FIG. 100, a secondary heating circuit (that is one originating from the buffer tank) is seen to circulate through a heat exchanger (that is part of Applicants' secondary fluid flow pathway) inserted into the working fluid (glycol, fresh water or the like, not the crude oil product) of an existing or prior art separator. In FIG. 10D, secondary fluid flow pathway comprises lines that carry the working fluid of a prior art separator into and out of the buffer tank 18. That is to say, the secondary fluid pumped through the buffer tank is the working fluid of the existing or prior art separator. In FIG. 11A, secondary fluid flow pathway includes heat exchangers that are adapted to engage the contents in the interior of a heater treater, which contents are typically not a working fluid, but at least in part, product from the wellhead. That is to say, in FIG. 11A, secondary heating circuit provides for secondary fluid flow pathway through heat exchangers (as part of Applicants' system) that are in direct contact with product.

Turning back to FIG. 5, it is seen that second pump 114, engages the secondary fluid flow pathway 210 and moves the second fluid SF between the outlet 18A, the oil heat exchanger 19, and the inlet 19A of the oil heat exchanger 19 and back to the heat exchange buffer tank 18.

A bypass fluid flow pathway 210A fluidly engages the secondary flow pathway 210. The bypass fluid flow pathway 210A includes a temperature responsive proportional or tempering valve 117 for diverting at least some of the second fluid such that it bypasses the oil heat exchanger 19, when the SF exceeds a pre-selected minimum, for example, 135° to help prevent an overheat condition in oil heat exchanger 19.

FIGS. 6A, 6B, and 6C are various views of the oil heat exchanger 19. This may be a tube-in-tube heat exchanger with the second fluid in the annulus between inner tube IT and outer tube 19C. There are typically two sections, an upper and lower section, and each of the two sections has a novel pipe-in-pipe or tube-in-tube construction. Both sections may be about twelve feet long. The three inch inner pipe or inner tube IT carries the ambient product in from the oil well head and the warmed product out. The 4½ inch casing or outer tube 19C is placed outside the 3 inch pipe and the annulus between the inner and the outer pipe carries the secondary fluid. A twisted spoiler or turbulator 19D is seen in FIG. 6A on the outside of the 3 inch inner tube IT. This turbulator helps generate turbulent flow of the secondary fluid in the annulus between the two pipes to help better distribute heat to the inner pipe containing the product. As seen in FIG. 5, a turbulator of baffles 19e may be used on the interior of inner tube IT to help the efficiency of the heat exchange.

A one inch pipe supplies hot glycol or other suitable secondary fluid SF from heat exchange buffer tank 18 to the annulus between the two pipes by engaging outer tube or pipe 19C. Temperature probes E and F may be inserted at the points indicated in FIG. 6C or other suitable points and may electronically control a flow rate control valve 116 located on the inner tube IT, or such flow rate control valve 116 may be manually adjusted. If the temperature of the warm product coming out of the oil heat exchanger 119 is not sufficiently high, product flow may be restricted by flow rate control valve 116 so resident time of the product within the heat exchanger 19 increases.

Figure 7A:
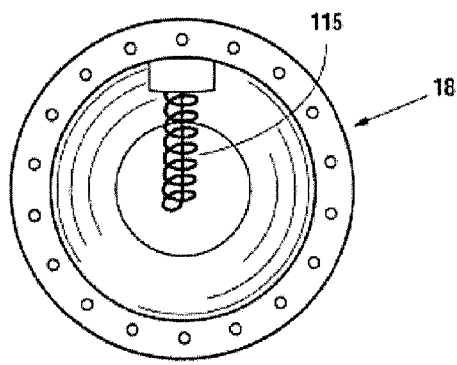
FIGS. 7A, 7B, and 7C are illustrations of elements of Applicant's heat exchange buffer tank and oil heat exchanger showing the heating coils in the heat exchange buffer tank and the insulation on the heat exchange buffer tank and oil heat exchanger.
Figure 7B:
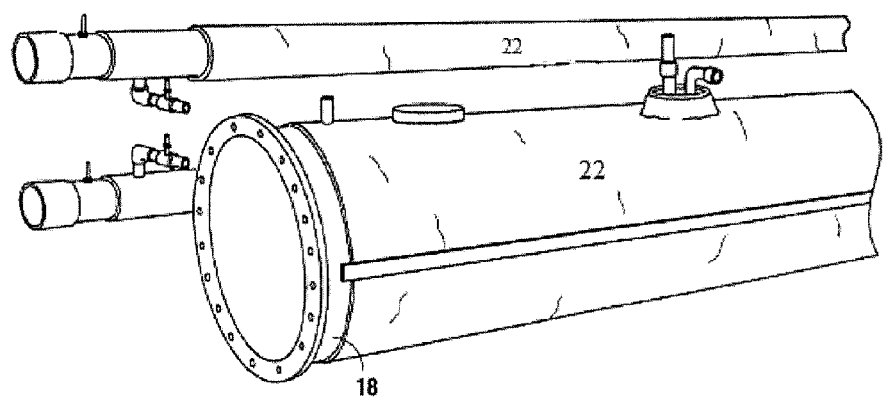
Figure 7C:
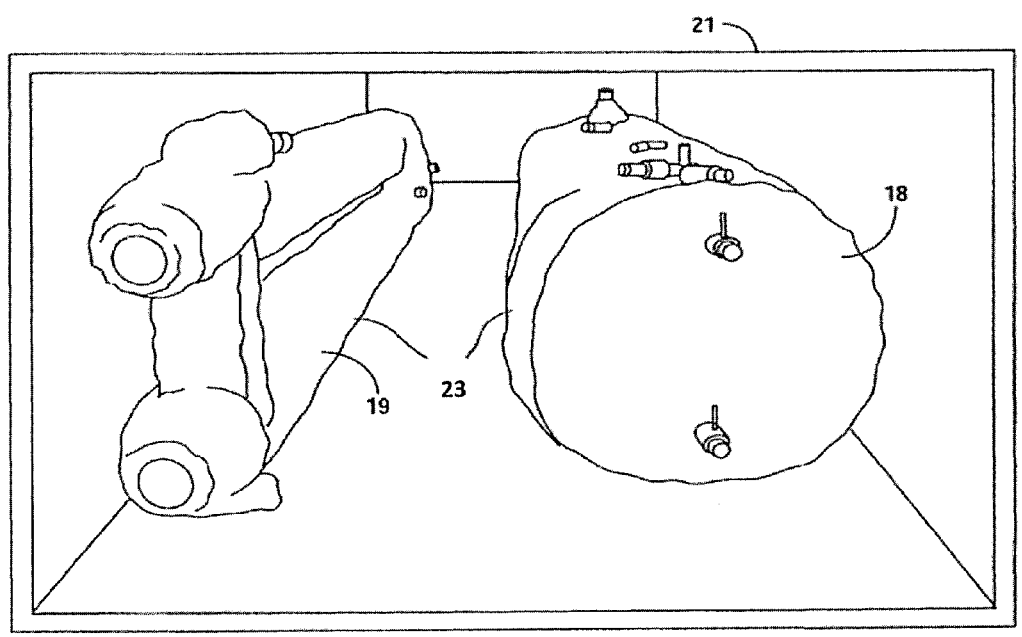

FIGS. 7B and 7C illustrate methods of insulating the heat exchange buffer tank 18. These include wrapping the tank in R13 or other suitable housing configurable insulation with aluminum backing (see FIG. 7B). A second application of insulation may be provided as seen in FIG. 7C. This illustrates a second application of spray 3 to 4 inches thick of cellpolyurethane foam or other spray insulation 23, over the R13 insulation. It has been shown that cellpolyurethane insulation, when directly exposed to flames, will melt, but not burn.

The heat exchange buffer tank 18 may also include an expansion tank 16 with a pressure relief valve P at engaged therewith to allow a receptacle for fluid, such as a glycol second fluid, to expand thereinto. A second expansion tank 16A is placed in the first fluid flow pathway 20 (out and return) typically just downstream of the first fluid pump 15A.

Sensors A, B, C, and D are located as illustrated in FIG. 5. Sensor A measures the temperature of the first fluid just as it leaves outlet 11B of the solar collector 11. Sensors B, C, and D all measure temperature of the second fluid. Sensor C is located adjacent outlet of the heat exchange buffer tank 18, that is, outlet 18A, and is typically about the hottest spot for the second fluid in the system. On the other hand, at inlet 18B where sensor B is located, it is typically the coolest spot for the second fluid in the heat exchange buffer tank 18. Sensor D is typically located at the outlet of the oil heat exchanger 19B where the fluid will be cool. Sensors E and F sense temperature of product and control flow control valve 116, which may be done either manually or electrically. Sensors E and F are for controlling flow valve 116 (permitting greater product flow), high ΔT opens 116, low ΔT closes down (restricting product flow). This helps control product out temperature. Low ΔT will slow down the flow to leave more time for product in the oil heat exchanger.

Sensors A, B, C, and D engage a multiple differential temperature control 113 to control pump 15A, valve 17, and pump 114. Sensor F thru controller 113 can energize or de-energize optional backup electrically gas boiler or co-generation heat source. Pump 15A controls the first fluid flow in the primary heating circuit 100 and pump 114 controls the flow of second fluid in the secondary heating circuit 200. When sensors A and B indicate a delta T (temperature difference) between sensors A and B wherein the delta T exceeds a pre-selected temperature (and A is warmer), for example, 16° F., then pump 15A is activated to circulate fluid from the solar collector 11 to the coils 115B/115C. The secondary fluid flow pathway 210 is seen to include (optionally) a thermostatically controlled electric heating coil 112, typically, in one embodiment, just downstream of pump 114 and upstream of inlet 19A to provide backup heat to the product heat exchanger 19, if the solar collector 11 and circuits 100 and 200 are not providing sufficient heat. A high efficiency condensing boiler heated by natural gas, by propane or by any other suitable means, or a co-generation element (for example, heat exchanger 432 in FIG. 13) may be used for auxiliary or backup heat in the same manner as the electric heating coil or other auxiliary heater 112. Moreover, any auxiliary heating unit can go into the buffer tank or anywhere downstream the buffer tank in a location suitable to heat the secondary fluid.

When the temperature difference between sensors C and D exceeds a pre-selected temperature difference, for example, 20° (and C is warmer), temperature control 113 activates pump 114 to remove heat from the heat exchange buffer tank and move it to the oil heat exchanger 19.

Solar bypass three-way electrical motorized valve 17 is provided in the first fluid pathway and is controlled by multiple differential temperature control 113. When sensor B hits a pre-selected high temperature (for example, 195°), then the valve shuts off fluid flow to the heat exchange buffer tank 18 and shunts it to heat dissipater 110A. This prevents an over-temperature or over-heat situation in the heat exchange buffer tank 18.

A first tempering valve 111 is provided in the primary heating circuit 100 typically in the position illustrated in FIG. 5 to proportionally control the flow of the first fluid to divert some or all of such flow to the heat dissipater and the rest of such flow to the heat exchange tank as seen in FIG. 5. The first tempering valve may be set at, for example, 195°. When first fluid temperature exceeds that temperature, some of such fluid will be diverted through the heat dissipater 110A.

A second tempering valve 117 may be provided. Regarding the second tempering valve 117, it is used to help control fluid flow through the secondary circuit. It may be set for a temperature range of 110-160°, typically 135° F., and will divert at least some of the fluid which would normally flow through the oil heat exchange 19, back to the heat exchange buffer tank 18 to avoid an overheat condition in the oil heat exchanger 19.

One such temperature control valve is the Tempmatix TS1-4 available from Independent Energy Center, Farmington, N.M. (www.iecsolar.com). This valve is fully automatic, pre-calibrated, and requires no electricity. It is capable of withstanding a maximum temperature of about 400° F. and a maximum pressure of about 350 psi. It is designed for use in three-way mixing or diversion applications. This valve automatically and accurately proportions flow in response to fluid temperature. The valve gradually actuates, opens partially at 5° below a set point temperature (for example, 195° F.) and open at 5° above a set point temperature to avoid water hammer effects. Low head resistance allows for high flow rates to accommodate high temperature multi-array systems. Each unit is manufactured for long life and maintenance-free operation.

FIG. 7A illustrates the interior of heat exchange buffer tank 18 with heat exchange or heat exchange coils 115 in the interior thereof. FIG. 7B illustrates that buffer tank 18 may be wrapped in a flexible insulated, wall conforming weather jacket 22 to protect heat loss in the secondary fluid that is contained therein. Oil heat exchanger 19 may also be wrapped in jacket 22. In FIG. 7C, elements of Applicants' system may be at least partially enclosed within a container or box 21 and, thus rendering Applicants' system being modular in nature. At least some of the main components here, buffer tank 18 and oil heat exchanger 19, covered with insulation place inside box 21 or other enclosure. In an alternate embodiment of Applicants' modular system, oil heat exchanger 19 is not placed in container or box 21.

FIG. 7B also illustrates the insulation used on the upper and lower tube-in-tube portions of the oil heat exchanger 19. As seen in FIG. 7C, these may also be sprayed with cellpolyurethane over the R13 or other insulation.

Figure 8A:
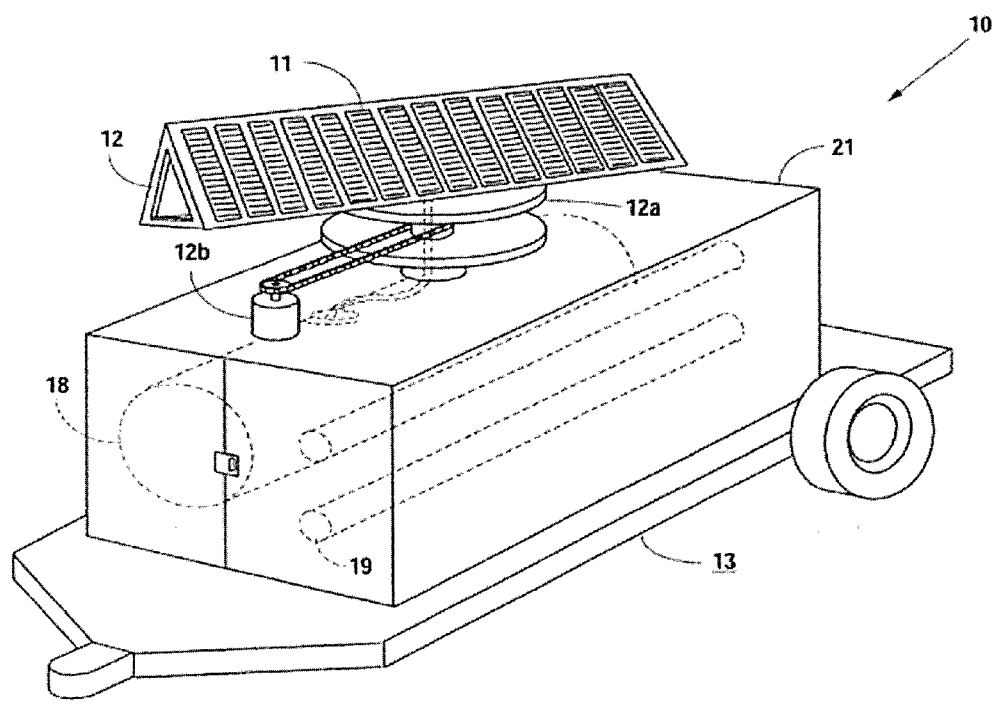
FIGS. 8A and 8B are illustrations of elements of the frame and carousel, as well as the solar collector portions of Applicant's system.

FIG. 8A illustrates that solar panel 11 may be mounted to the top of box or other enclosure 21, which itself may be mounted on a skid (not shown) or trailer 13. Enclosure 21 may include a top wall in which a carousel 12a driven by a motor M and electronics as known in the art of solar collectors is provided so that the solar panel may track the sun. Using Applicants' mobile mount, such as a trailer 13, as well as Applicants' system at least partially "modular" as by enclosing in a box or other enclosure 21 provides for ease and movement of the parts and elements of the system at the well site.

FIG. 8A illustrates solar collector carousel 12A on which one or more solar collectors 11 may be mounted. A carousel provides rotational movement, typically continuous, for following the sun's movement through the day to maximize the energy accumulation of the solar collector from the sun. Solar collector carousel 12A typically includes a frame 12 on which the solar collector or panel is mounted. Additional elements of the carousel may include a timer and a motor to impart rotation to the base.

Fixed collectors may be used and a preferred type of fixed collector is the evacuated tube style collector illustrated in FIG. 5. While two panels are illustrated, more may be used depending on the weather conditions at the site, the type and amount of oil produced, and other factors.

A multi-axis carousel or other rotation device may be used in conjunction with the solar panels. A multi-axis or dual axis assembly will track the movement of the sun from morning to evening and also seasonally adjust the tilt angle of the solar panels. While a tube style collector is illustrated, any other suitable collector, including a flat plate collector, such as those manufactured by Heliodyne or A.E.T. are also suitable.

Figure 8B:
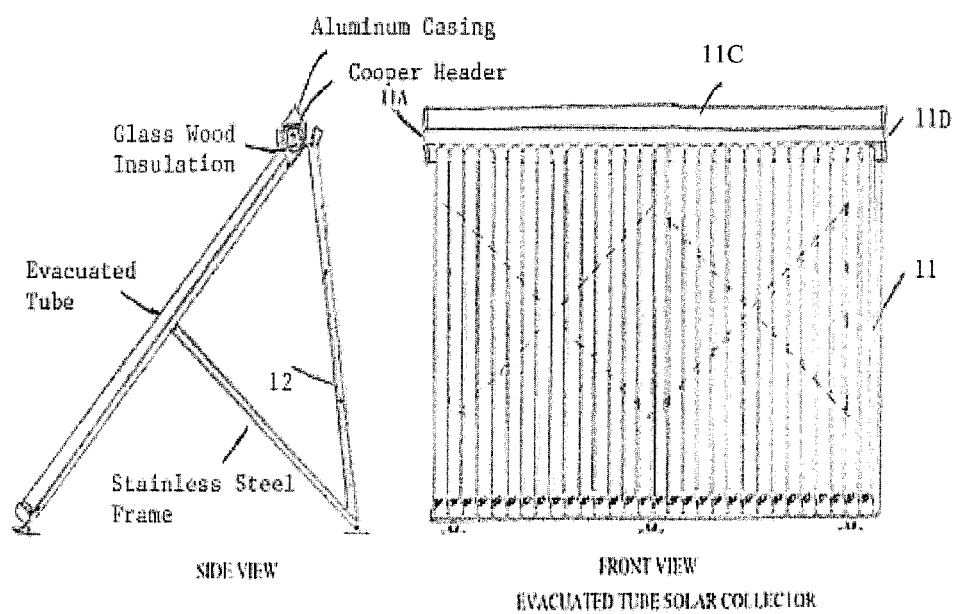

Any suitable solar hydronics may be used. One solar collector that is used in a preferred embodiment is constructed of two Apricus AP-30 solar panels mounted to the solar carousel 12A at an angle of between about 13-57° (see FIG. 8B) and run in series as illustrated in FIG. 5. Each of the two AP-30 panels consist of 30 solar tubes 11d, which may be evacuated tubes placed parallel inside a 439 grade stainless steel frame. The tubes are connected to a copper header 11c that is concealed within an aluminum casing. Glass wool or other insulation surrounds the copper header 11c, which copper header 11c engages and is in fluid communication with inlet and outlet 11A and 11B (see FIG. 8B). In using the Apricus AP-30, a glycol water or other suitable solution is typically used as the first fluid for circulating between the copper header and heat exchangers 115C/115D, hereto which are immersed in the heat exchange buffer tank.

Heat exchangers 115C/115D may include balance valves 115A/115B as indicated between the inlet and outlet of each of the two used as illustrated. By a partial shutting down of 115A, some of the fluid will flow through the first heat exchanger 115A and some will flow to the second 115B. Both 115A/115B are normally closed, but are used for maintenance (when coils need to be replaced).

Figure 9:
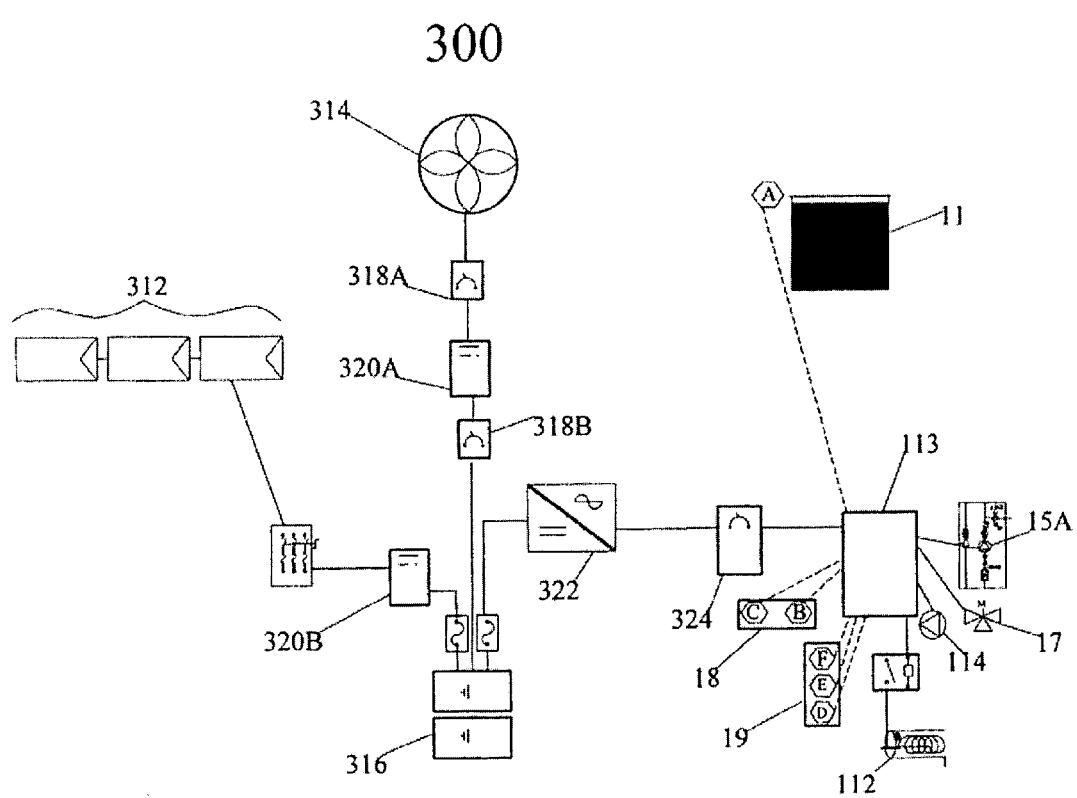
FIG. 9 is an illustration showing the main components of a unit providing 120 volt AC output for use with Applicant's enhanced separator system

FIG. 9 illustrates G-SWEH (or auxiliary electrical energy unit) Unit 300. G-SWEH Unit 300 uses green energy, namely, solar and/or wind energy, to provide an efficient electricity generating unit for use in conjunction with Applicant's system especially when "off grid."

G-SWEH may include photovoltaic cell array 312, which may include one or more panels to convert solar energy to AC output for power components of enhanced separator system 10. ADC wind generator 314 may be provided to power a set of DC batteries 316. Batteries 316 may be a pair of 245 amp hour, 24 volt DC configured for 5880 watts total power. Fuse or circuit breakers 318A and 318B may be provided between the DC wind generator 314 and a first controller 320A. A fuse or circuit breaker 318B may be provided between the DC wind generator 314 and the batteries 316. The charge controller will help prevent an overcharging condition. Charge controller 320A, such as a 60 amp charge controller, will help control charge fluctuations. Charge controller 320B may also be provided between the photovoltaic cell array 312 and batteries 316. In both cases, charge controllers 320A/320B are typically adapted to increase the photovoltaic array power yield through active cooling and intelligent software controller thermal management cooling. The charge controllers may step down a higher voltage solar array or wind generator to recharge lower voltage batteries. The use of circuit breakers and charge controllers will help prevent battery overcharge. In a preferred embodiment, a DC wind generator may be provided, but an AC wind generator may be used with a rectifier.

Batteries provide DC output to an inverter 322 that may provide AC output to an AC disconnect 324. Typically, the energy provided by G-SWEH Unit 300 will provide power to the delta T controller 113, the solar bypass motorized valve 17, and pumps 15A and 114. The G-SWEH Unit 300 is especially useful when enhanced separator system 10 is off the electrical grid, but may be incorporated on grid and drive excess electrical energy back to the grid.

The photoelectric array may be made up of solar panels from Mage, such as 230 watt electric solar panels. The DC disconnect is available from Square D, for example, a 20 amp DC HD disconnect fuse. Fuses are available from Ferraz Shawmutt, for example, a 15 amp type R. The charge controllers are available from Outback Power. Batteries are available from MK Battery and may be group 8D, 245 amp-hour, agm 12 volt. The inverter may be a 600 watt 24 volt DC inverter and Square D may also provide the AC disconnect (for example, 15 amp).

Solar collector components of the enhanced separator system 10 are available from Apricus as set forth above. IEC may provide the diversion (tempering valves). Apricus may also provide the liquid to air heat dissipaters. A high temperature solar air vent and high temperature isolation valves (see FIG. 5) are available from Caleffi. Three speed storage to heat exchange pump unit may be a 120 volt AC pump available from Taco. Taco may also provide 1½ inch flange kits with iso valves and Apricus may also provide high angle collector frames.

Figure 9A:
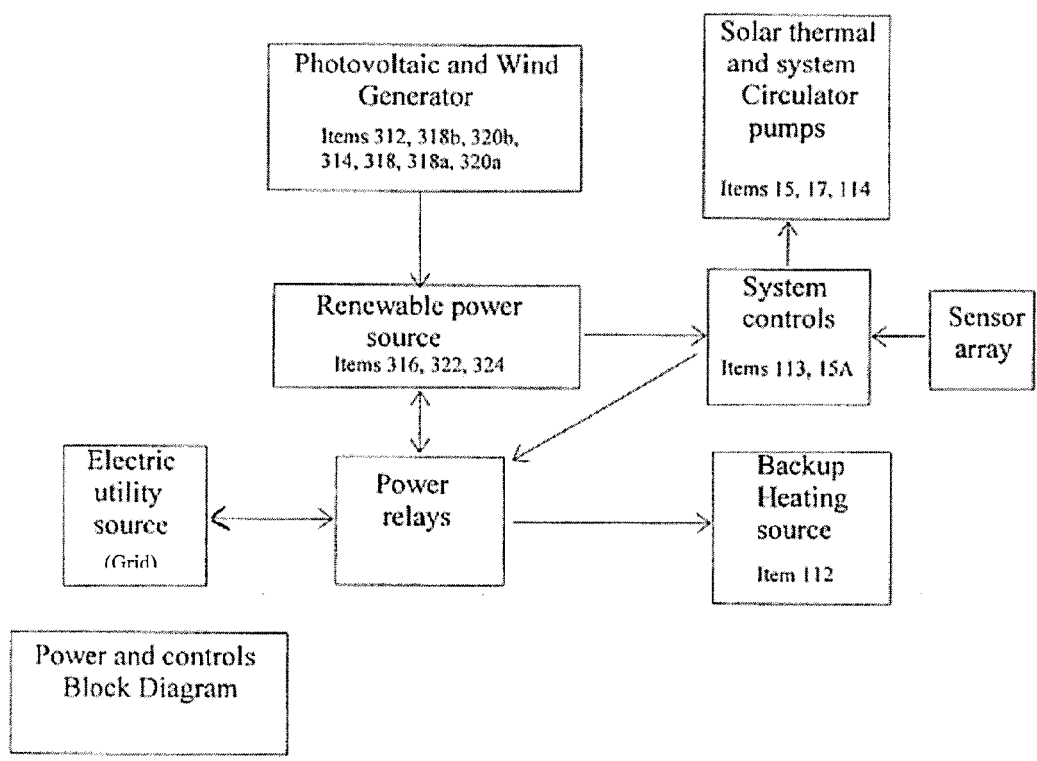
FIG. 9A is a schematic drawing of the manner in which the various elements of Applicants' system engage one another.

FIG. 9a illustrates various components, in schematic flowchart, in block diagram form of the engagement of the power and controls of Applicants' system. An electrical utility source "on grid" engages an array of power relays which in turn power Applicants' backup heating source element 112 and/or system controls 113/15a. Controls are responsive to the sensor array as further described elsewhere in this specification. The system controls circulation and provides heat transfer between the solar panel and the buffer tank, and the buffer tank elements engaged therewith. Off-grid photovoltaic and/or wind generators may provide renewable power to engage the power relays and/or the control systems as indicated. It is seen from FIG. 9a that excess energy from Applicants' renewable electrical energy source may be sold back to a utility.

Figure 1:
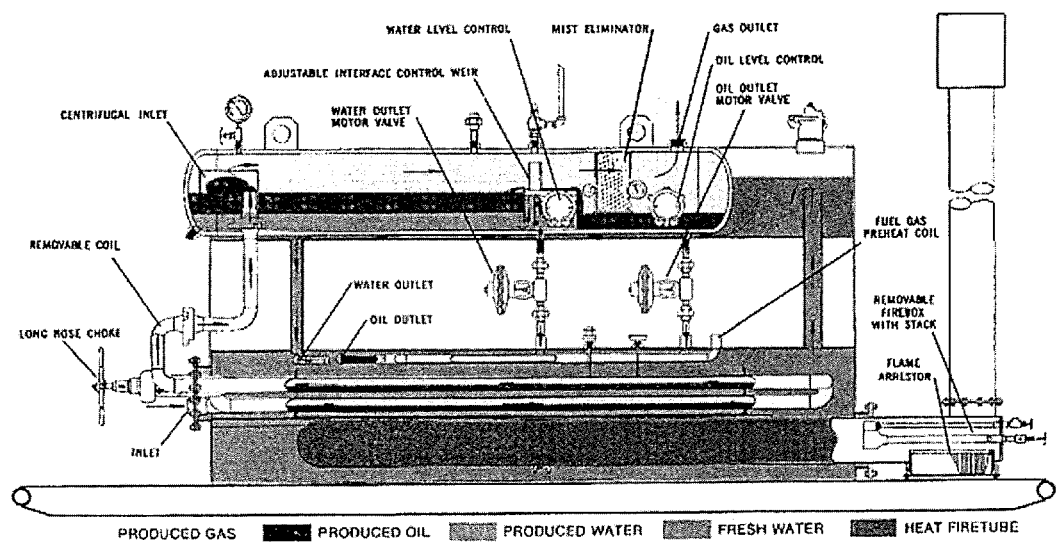
FIG. 1 is an equipment drawing showing a product separator of the prior art.
Figure 2:
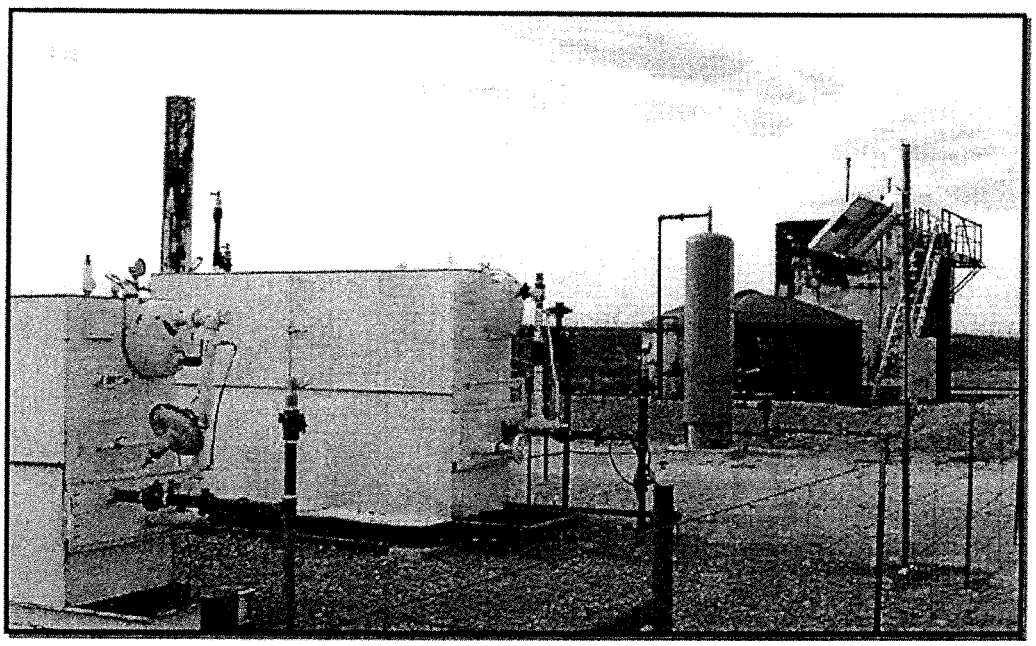
FIG. 2 is a photographic illustration of the prior art separator illustrated in FIG. 1.
Figure 3:
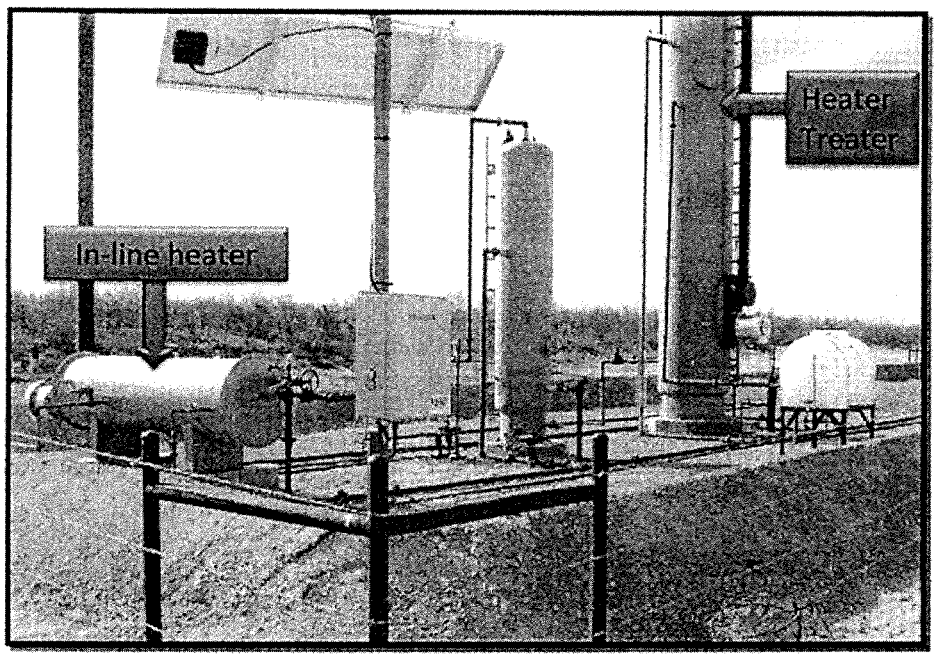
FIG. 3 is a photographic illustration of a prior art inline heater and vertically oriented Heater Treater for use in separating product.
Figure 4:
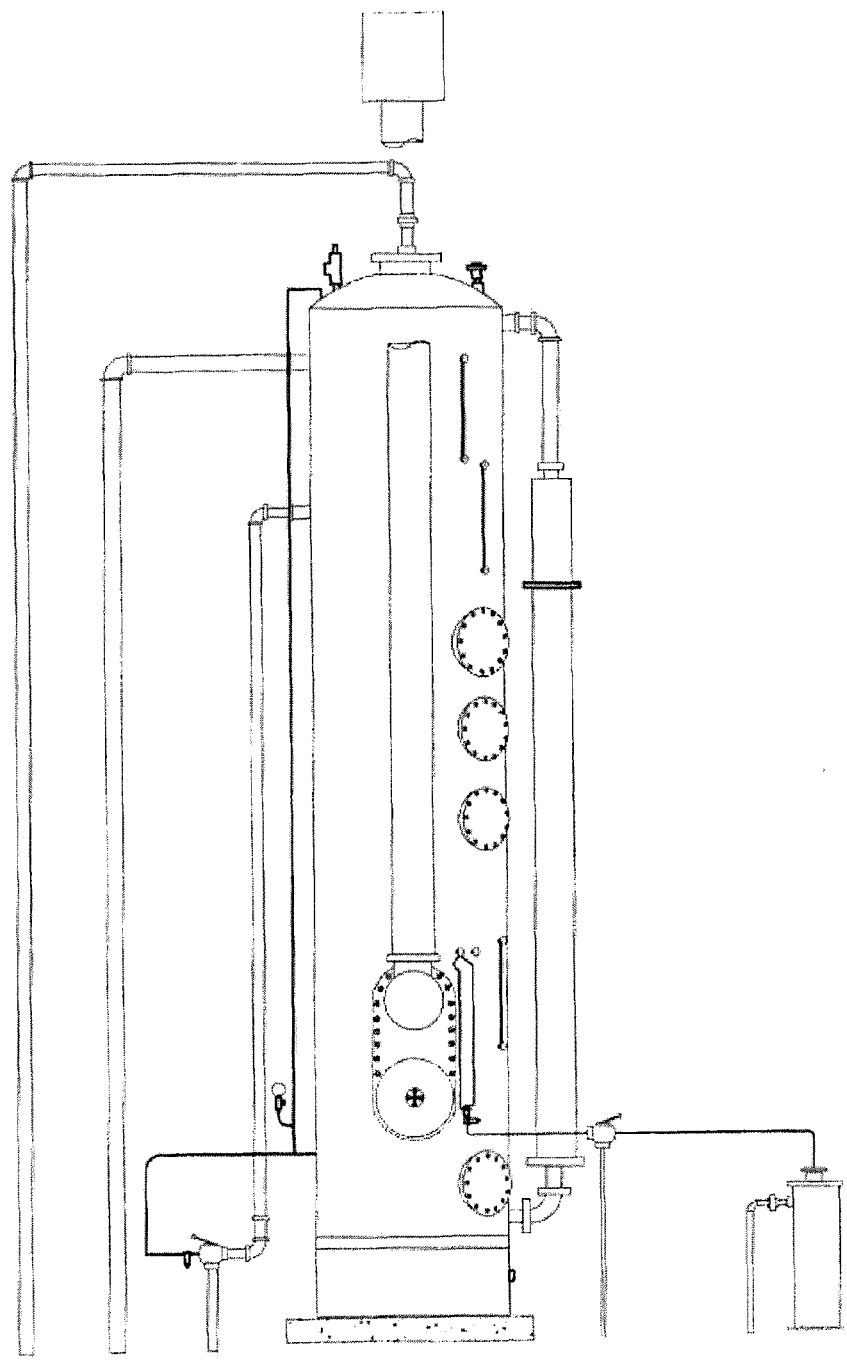
FIGS. 4 and 4A are equipment illustrations showing two types of vertical low pressure product separators of the prior art sometimes called a "Heater Treater."
Figure 4A:
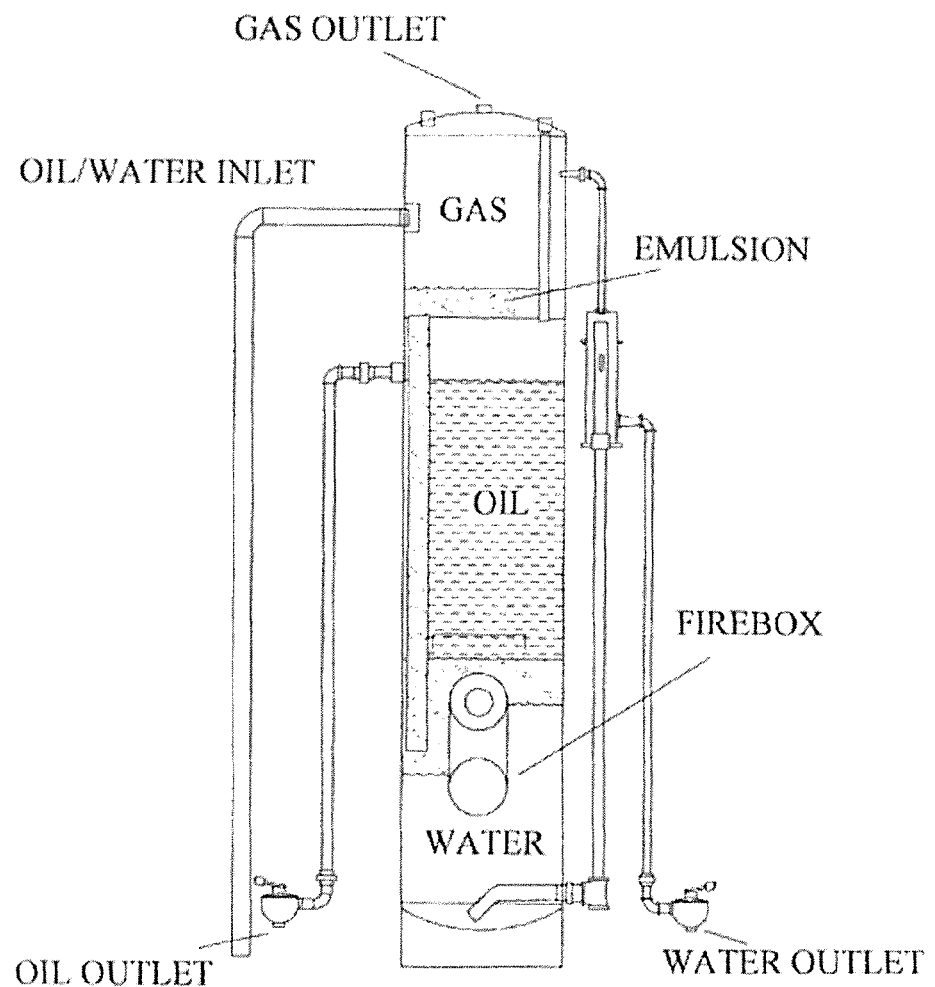
Figure 10A:
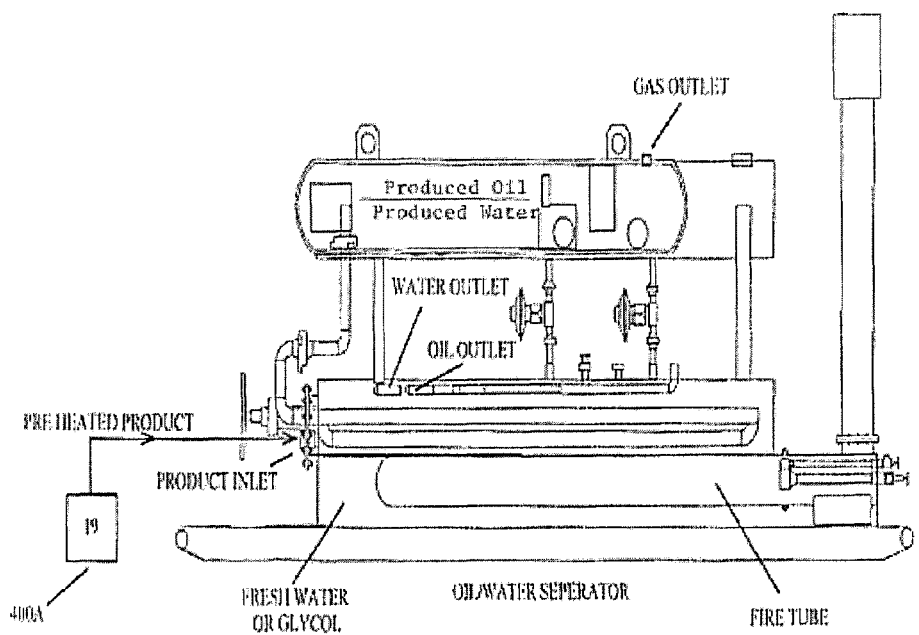
FIGS. 10A, 10B, 10C, 10D, 11A, and 11B illustrate retrofit and conversion of prior art separator systems.

An embodiment of Applicants' system is illustrated in FIG. 10A. FIG. 10A illustrates a prior art system substantially similar to that illustrated in FIG. 1, a horizontal high pressure separator system. However, as seen in FIG. 10A, modification or retrofit 400a is provided to the separator by the "splicing in" of Applicants' oil heat exchanger 19 into the line carrying product from the wellhead to the separator. Preheated product from the outlet of Applicants' product heat exchanger 19 is fed into an inlet (either existing or fabricated) of the prior art separator. That is to say, instead of product coming from the wellhead into the inlet of the prior art separator as illustrated in FIG. 1, Applicants' modification or retrofit 400a preheats the product and feeds it to the inlet as set forth in FIG. 10A. In this manner, the natural gas used to heat the fire tube may be either bypassed entirely or substantially reduced.

Figure 10B:
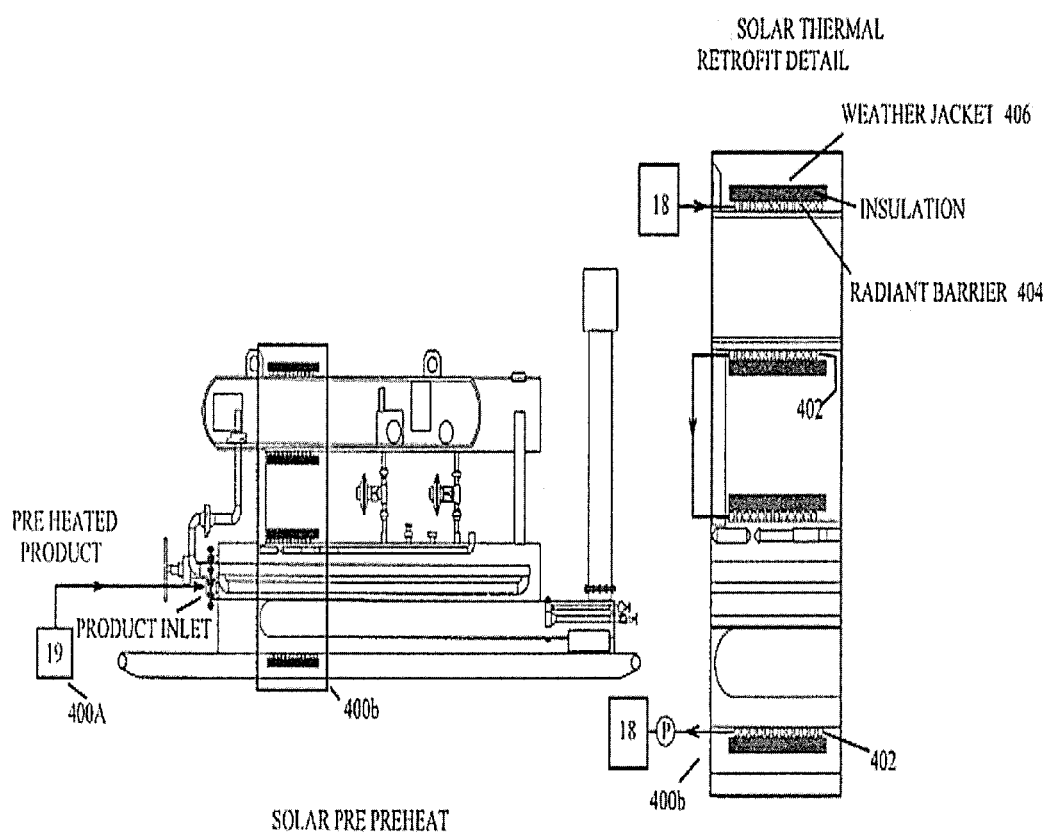
Figure 11A:
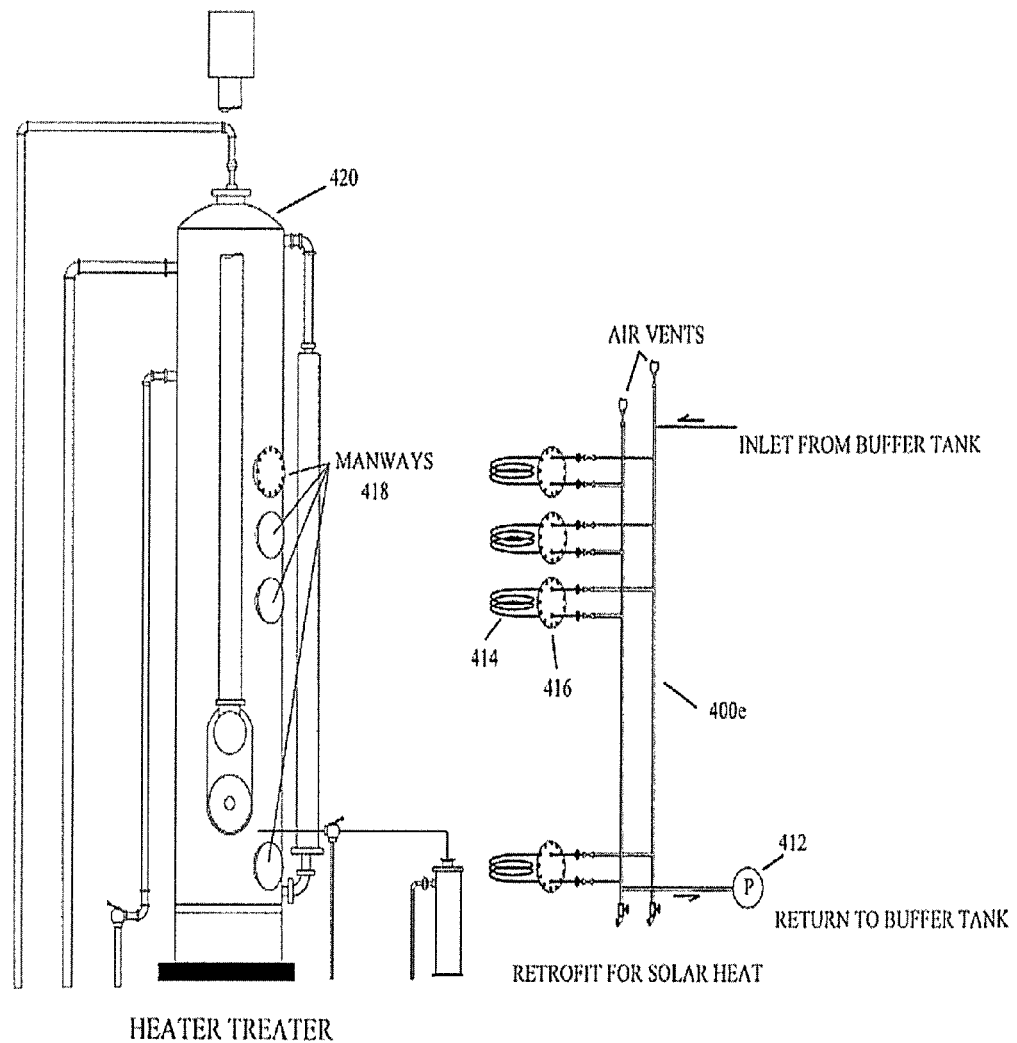

In FIG. 10B, a retrofit or modification 400b is seen showing how secondary fluid from buffer tank 18 is pumped between Applicants' buffer tank 18 and coil tubing 402 wrapping the upper and/or lower sections of the prior art system as illustrated in FIG. 1 to heat the product in the prior art separator. Indeed, tubing 402 may be wrapped around either or both the upper or lower vessels as seen in FIG. 10B and the detail of FIG. 10B, and such coil tubing may be wrapped with a radiant barrier 404 and a weather jacket insulation 406 to help reduce heat loss to the environment. Thus, the heat exchanger carrying the secondary fluid is wrapped around a portion, typically of the outer housing of the prior art separator.

Figure 10C:
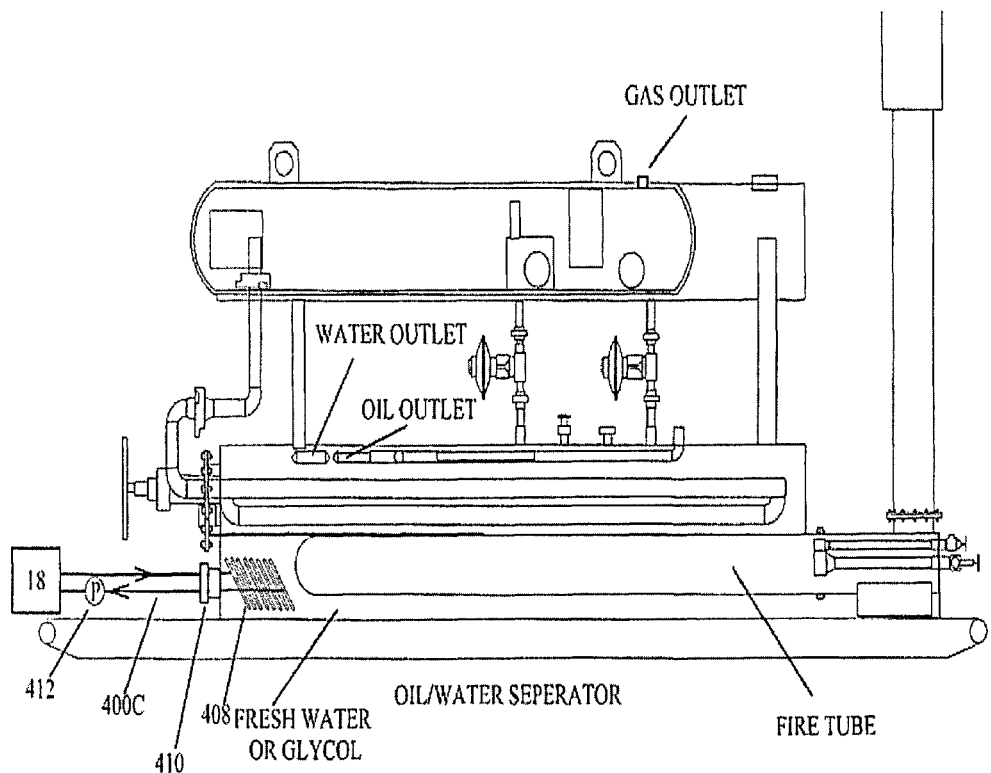
Figure 10D:
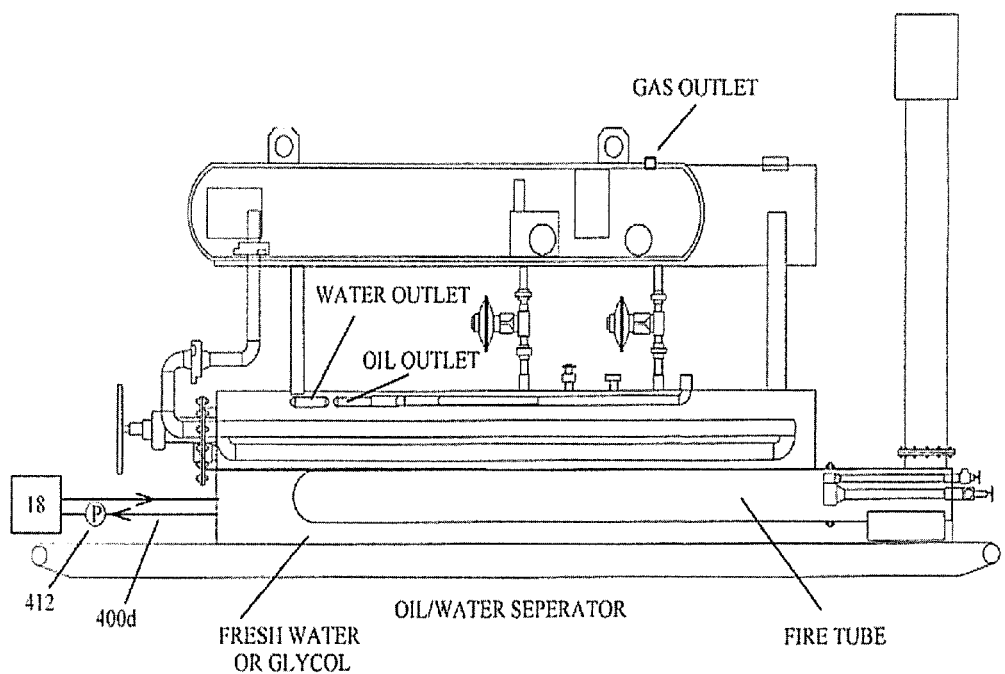

FIG. 10C illustrates heat exchanger modification or retrofit 400c of a prior art separator as set forth substantially in FIG. 1. Here, modification of retrofit 400c includes the addition of exchanger 408, its coil tubes inserted into fresh water, glycol or other heat transfer medium that is provided for in the prior art separator. That is to say, the prior art as seen in FIG. 1 has a fire tube that heats up a working fluid, such as fresh water, glycol or other suitable fluid, which working fluid in turn is in heat exchange relation with product received from the well. Here, product from the well may or may not be preheated as set forth herein, but in the modification or retrofit 400c illustrated heat exchanger 408 is provided so that fluid from buffer tank 18 will heat the working fluid of the prior art separator. Flanges 410 may be fabricated and attached, as by weldment or the like, to the housing or walls of the prior art separator for engagement of heat exchanger 408 therewith. A pump 412 may be provided between the secondary fluid in the buffer tank and the interior of the separator for circulating the secondary fluid therethrough.

FIG. 10D illustrates a modification/retrofit 400d of the prior art separator substantially as seen in FIG. 1, wherein the working fluid of the separator is used as the secondary fluid in Applicants' buffer tank 18 and a pump 412 provided to pump secondary fluid between the interior of the prior art separator and Applicants' buffer tank 18. In the embodiment illustrated in FIG. 10D, the fresh water or glycol of the prior art separator may be heated by both the fire tube when necessary and Applicants' heat exchangers 115 that are immersed in the secondary fluid in the buffer tank.

Figure 11B:
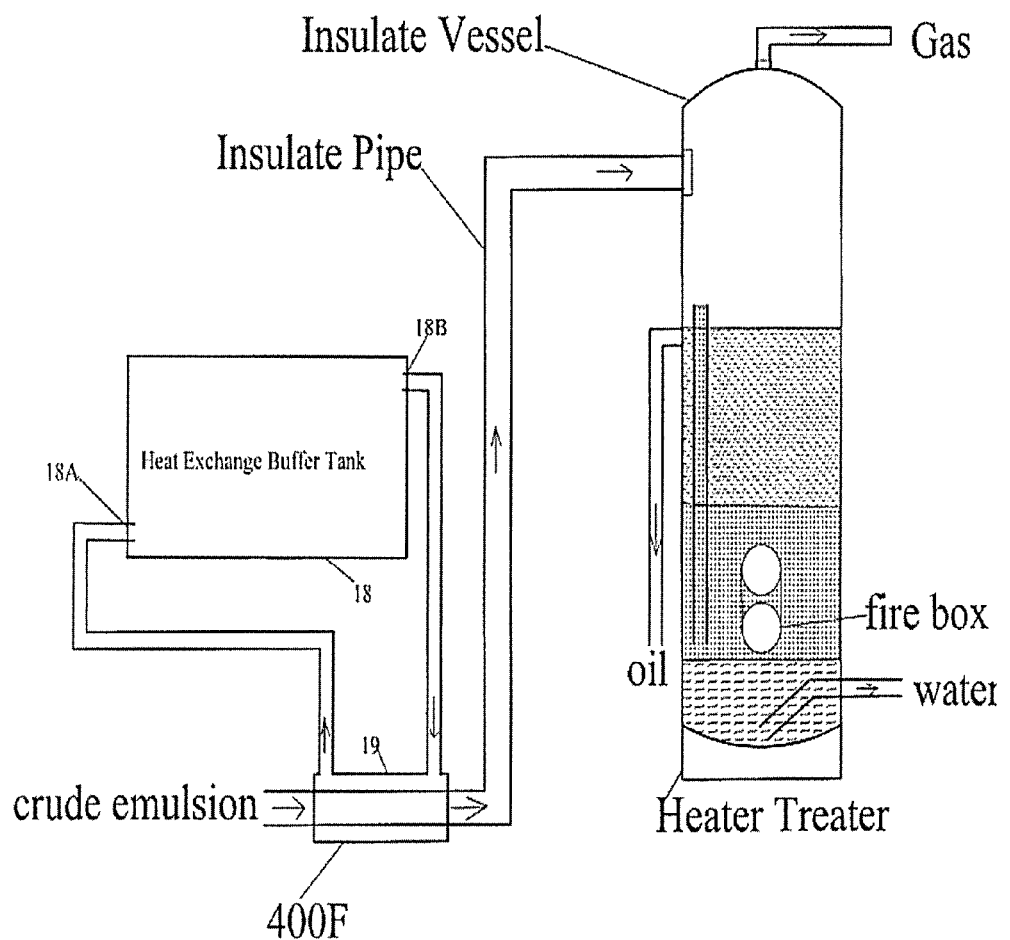

FIGS. 11A and 11B illustrate a retrofit or conversion 400e of a prior art vertical or Heater Treater separator to incorporate elements of Applicants' system. FIG. 11A illustrates modification/retrofit 400e illustrating the use of a series of stainless steel (or other suitable material) heat exchange coils 414 insertable into the inner volume of a vertical column of the Heater Treater to directly heat the fluids (typically product from the wellhead) thereof. Heat exchange coils 414 receive fluid from and return fluid to buffer tank 18. Thus, heat is transferred from buffer tank 18 to the separator contents, typically product, in the Heater Treaters, such as that illustrated in FIG. 11A.

In FIG. 11A, it is seen that heat exchange coils 414 are configured with metal covers 416 that may engage existing manways 418 of the vertical Heater Treater. That is to say, the existing manway covers are removed and fabricated covers 416 provided to engage the fastener holes of the existing flanges on the manways of the Heater Treater. Heat exchange coils 414 are configured to fit through an existing opening of the Heater Treater and into the interior thereof. That is to say, members are provided that retrofit/modify 400e existing structure so as to allow the insertion of one or more heating elements connected, as seen here, for example, in series (or in the alternative, in parallel) to circulate fluid from Applicants' buffer tank 18 through pump 412 to heat the contents, typically fluid product in the interior of the Heater Treater. Insulated jacket 420 may be provided for one or more portions of the outer surface of the housing of the Heater Treater.

In FIG. 11B, it may be seen that preheated product may be provided from Applicants' product heat exchange outlet to the inlet of a vertical type Heater Treater vessel for separation therein. In FIG. 11B, a modification/retrofit 400f of a vertical type Heater Treater as substantially found in the prior art treats preheated product substantially the same way as the modification set forth in FIG. 10A. That is to say, modification/retrofit 400f warms the crude oil product before it is received into the interior of the separator so that less heat is required from the fire tube.

As with the modification/retrofit systems of FIGS. 10A and 10B, those of FIGS. 11A and 11B anticipate the use of either preheated product or product directly from the wellhead (not preheated) with or without the use of heat exchange coils circulating hot secondary fluid from Applicants' buffer tank 18.

Figure 12B:
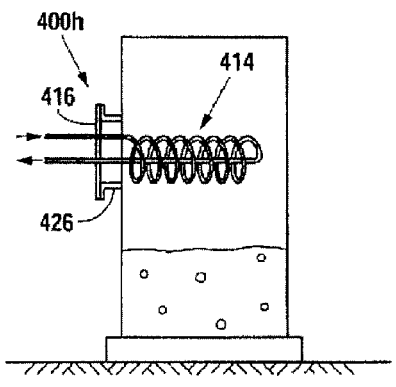
FIGS. 12A and 12B are views of a modification or retrofit to a vertical type separator.
Figure 12A:
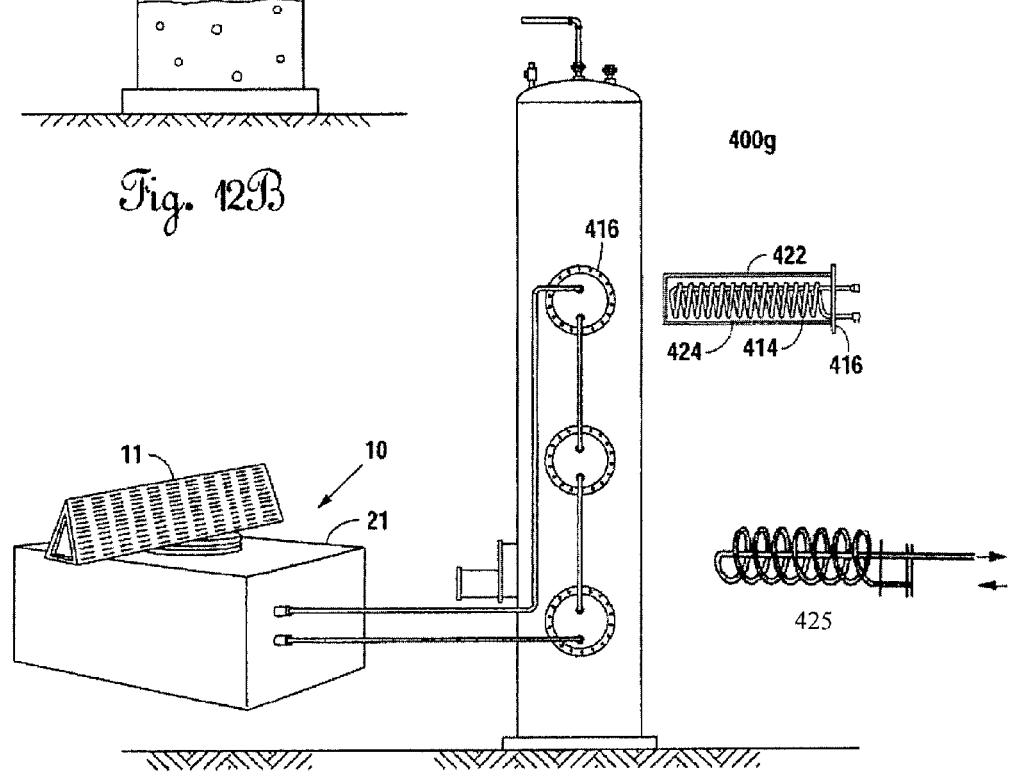

FIG. 12A illustrates secondary fluid from Applicants' buffer tank 18 being circulated through exchange coils 414 similar to those seen in FIG. 11A. One embodiment is illustrated in which a housing 422 is provided to covers 416, the housing containing a working fluid 424, such as glycol or a suitable oil or the like. In the retrofit/modification embodiment 400g illustrated in FIG. 12A, heat exchange working fluid 424 is provided to transfer heat from the warm heat exchange coils 414 to the fluid 424 and through housing 422 to the fluid contents of the interior of the Heater Treater. Housing 422 separates working fluid between coils carrying the buffer tank fluid and the contents of the Heater Treater so as to reduce the accumulation of debris and the like that may occur with the heat exchange coils 414 directly inserted therein, especially where the heat exchanger has a multiplicity of small tubes one adjacent the other. FIG. 12A also illustrates that an auxiliary heat exchanger 425 may be retrofitted or added to a separator in substantially the same manner as the heat exchangers carrying the secondary fluid. However, auxiliary heat exchanger 425 may be an electric coil provided to supplement solar heat exchangers or may be a co-generation heating coil (see FIG. 13) engaged with the housing of the separator so that auxiliary heating coil 425 helps heat the contents of the separator. Off-grid the auxiliary heating coil may be electrical and receive electric energy from Applicants' auxiliary electric unit as seen, for example, in FIG. 13.

FIG. 12B illustrates modification 400h, which comprises fabrication of a flange 426 located on the housing of the vertical Heater Treater. Modification 400h fabricates an appropriate member, such as flange 426, that is welded on the outer wall of the Heater Treater to provide a member for receipt of covers 416 thereon, such as by fasteners or the like, and for locating exchange coils 414 within the interior of the Heater Treater.

As seen in the foregoing illustrations, Applicants provide various structure to engage the buffer tank to pre-heat, and heat directly, or heat indirectly, the contents of a separator so that the use of natural gas will be decreased or eliminated. As part of providing flow in the various applications of the use of the secondary heating circuit 200 for separation of fluid, pumps 114/412 are illustrated. Flow control or the control of these pumps may be provided with thermal sensors and differential temperature controllers for controlling the pumps and thus the secondary fluid flow. These sensor arrays may be placed so that they engage the secondary fluid or the crude oil product. In one embodiment, temperature differential may control the flow of the secondary fluid. In another embodiment of Applicants' system, flow meters may be used between the producing well or wells and the separator to measure the flow of product into the separator. Such flow meter or flow meters and/or may control the flow of secondary fluid to and out of the buffer tank dependent upon the flow rate of the product, typically providing flow control in the secondary circuit when there is sufficient flow of product to the separator or separators.

FIG. 13B also illustrates that off-grid clean energy means may be provided as seen in FIG. 9 above for supplying energy to the pump, microprocessor, and other elements requiring electricity. Off-grid clean energy means may be modular 429, for the storage batteries and charge controllers thereof. Heat recovery may be provided from well site located compressors or other combustion engines. In addition, heat may be captured from pressure generated by the well or any other recoverable source and used as illustrated.

Figure 13:
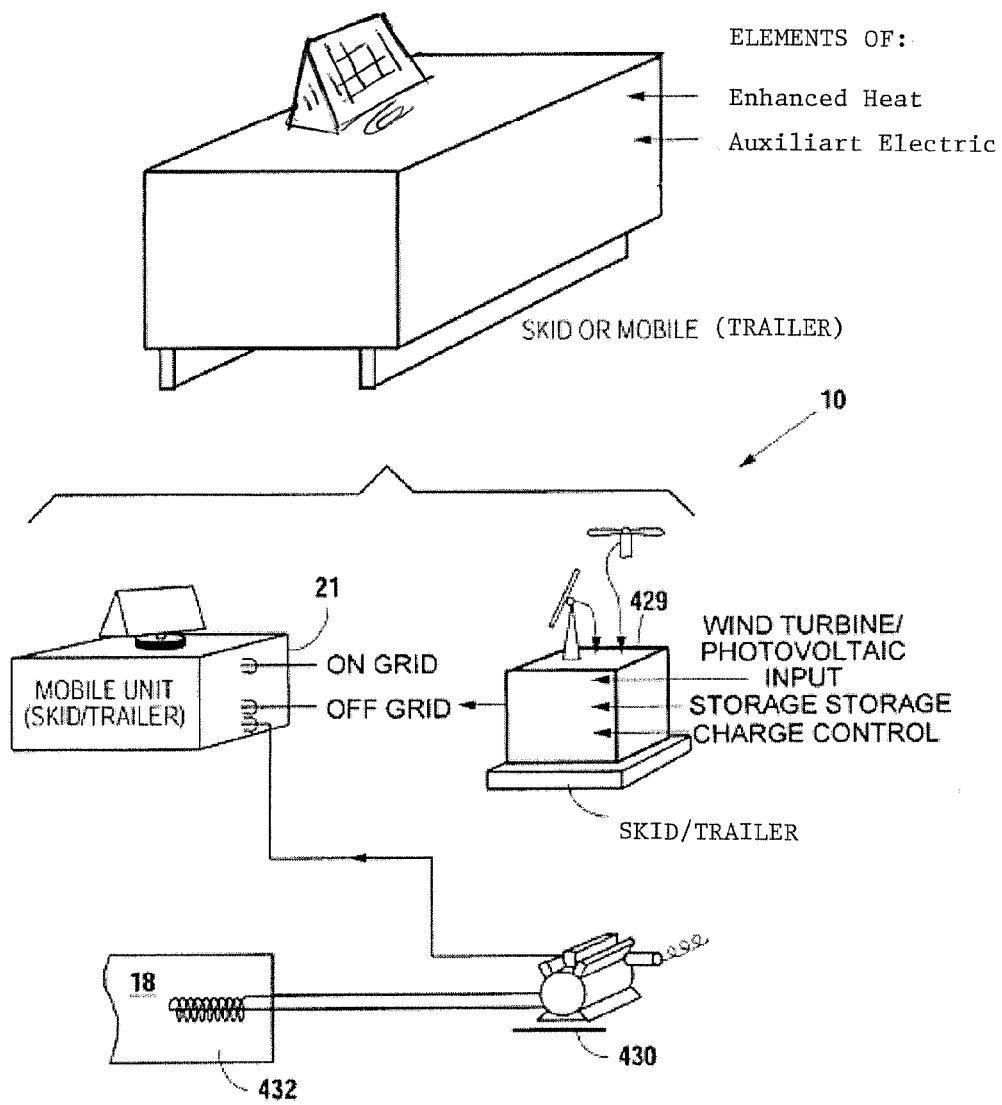
FIG. 13 illustrates the on-grid and off-grid options for powering Applicants' system.

FIG. 13 also illustrates the modular unit may be simply electrically connected "on-grid" where there is a suitable source of electricity at or near the production site. FIG. 13 also illustrates that off-grid application may include an onsite generator 430, such as a diesel or natural powered generator (for example, powered by natural gas from the separator or propane from offsite), for providing electricity. Generator 430 may, either in place of or supplementing the radiator of the engine thereof, have a heat exchanger 432 engaged with the water pump circulating coolant through the engine of the generator so that the waste heat of the generator is at least partially received in the buffer tank to heat the contents thereof.

Figure 14:
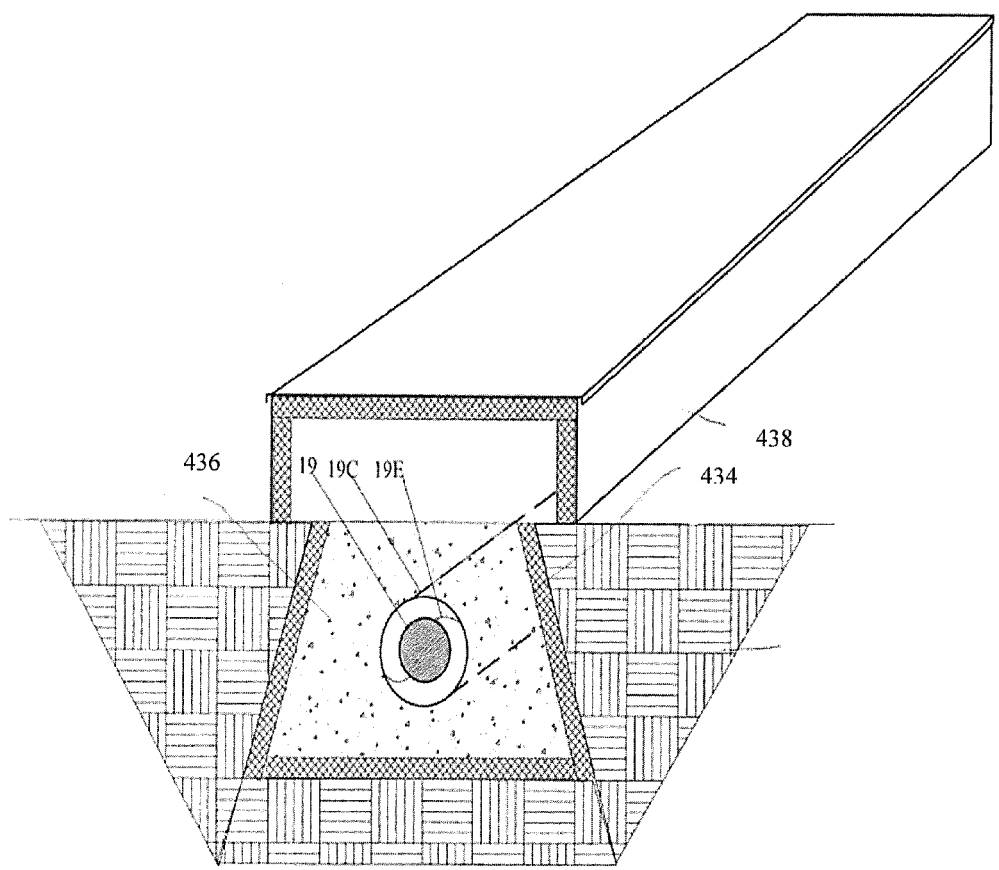
FIG. 14 illustrates an in-ground installation of elements of Applicants' system.

FIG. 14 illustrates that elements of Applicants' oil heat exchanger 19 may be buried in the ground. If so buried, insulation 434 may be provided, for example, extruded styrene sheets, which insulation will separate the ground from a thermal mass, such as sand 436 (providing thermal mass and constant for expansion and contraction). Above the ground in which Applicants' oil heat exchanger 19 is buried, there may be a shelter cover and service access member 438, which may be insulated, including having a reflective surface on the interior thereof to reflect heat back towards the sand/ground/oil heat exchanger and protect the buried elements from exposure. By burying the oil heat exchanger, which may be a tube-in-tube design, loss may be prevented and sand 436 or other suitable material may provide thermal mass for more effective heat transfer.

FIGS. 15, 15A, 16, and 17 illustrate an assembly 500 for solar heated site located oil storage tanks OST1 and/or OST2. At a remote oil producing oil site with a well W producing product or crude to a separator SP, the separated oil produced by the separator may be provided through line L1 to an oil storage tank OST1 and to oil storage tank OST2 through a second line L2. While two oil storage tanks are illustrated, any number from one to more than two may be included in Applicants' assembly and more than one separator may be provided. Indeed, there may be a multiplicity of wells feeding a number of separators and a number of separators feeding, with "separated product," a number of oil storage tanks OST1/OST2/OSTn.

The elements for providing a heated fluid A are, upstream of the oil storage tanks OST 1/2/n substantially similar as that disclosed herein with respect to FIGS. 1-14. That is to say, Applicants' oil storage tank assembly 500 uses heated secondary fluid, here designated fluid A, from buffer tank 18. Moreover, buffer tank 18 contains fluid A that is heated by a primary circuit generated by solar heat at solar panel 11 as set forth hereinabove. The application of the system with respect to FIGS. 15, 15A, 16, and 17 uses all the material aspects of Applicants' heat exchanger system provided to separators, but provides heat to the separated, stored product, which may be called "separated product" or "oil," that is generated upstream by the separator. There may be a multiplicity of Applicants' buffer tanks 18, each with their accompanying elements, at a remote site providing a heated fluid A in a secondary heating circuit to a multiplicity of separators and/or oil storage tanks OST 1/2/n.

Figure 15:
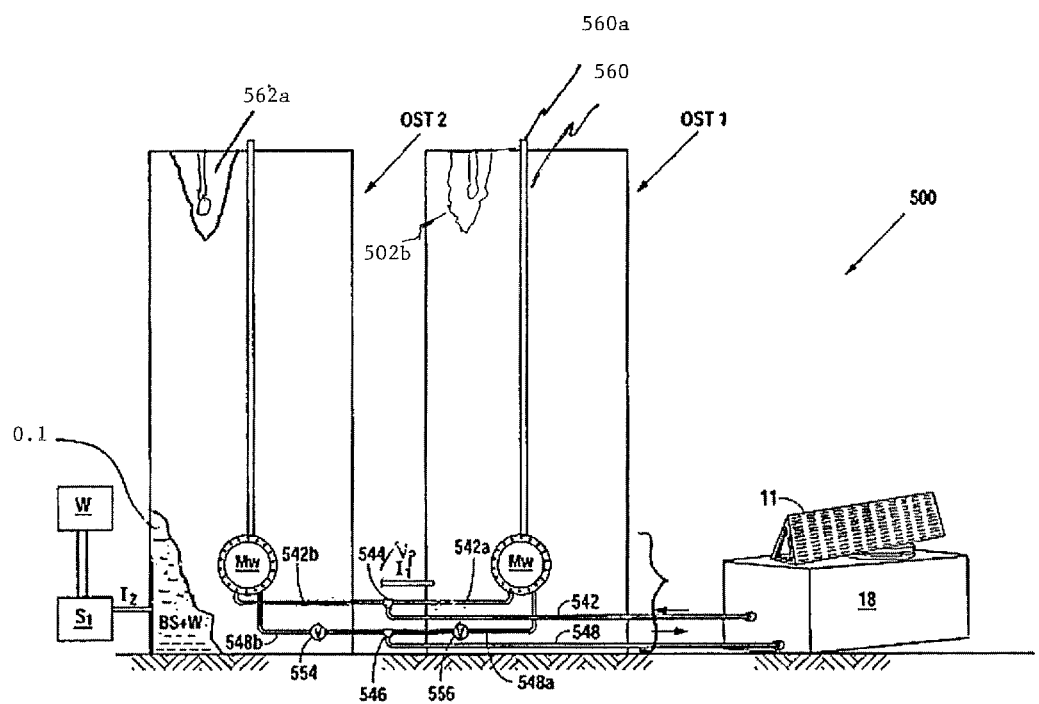
FIG. 15 is an external view of Applicants' assembly for solar heated site located oil storage tanks.

Existing oil storage tanks OST1/OST2 illustrated in FIG. 15, may be preexisting onsite oil storage tanks and may have manways Mw. Applicants' assembly 500 is, in one embodiment, intended to retrofit the existing OSTs by being configured to engage the manways as set forth hereinbelow.

Applicants' assembly 500 may be viewed as a multiplicity of "heated fluid" delivery lines and a multiplicity of "cooled fluid" return lines for carrying fluid of the secondary circuit, here designated fluid A, from remote buffer tank 18 to one or more OSTs, wherein each of the OSTs are fitted with one or more heat exchange assemblies 502. Heat exchange assemblies 502 are adapted to engage the existing manways and to be inserted into the interior of each of the OSTs and to provide heat thereto.

Figure 15A:
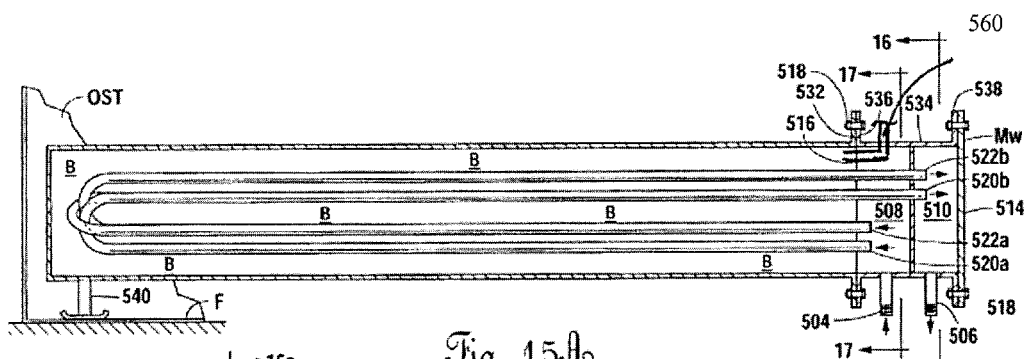
FIG. 15A is a side elevational cross-sectional view of the heat exchange assembly of Applicants' oil storage tank assembly.
Figure 16:
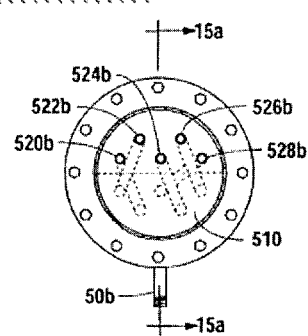
FIG. 16 is a front elevational cross-sectional view through Section 16 of FIG. 15A.
Figure 17:
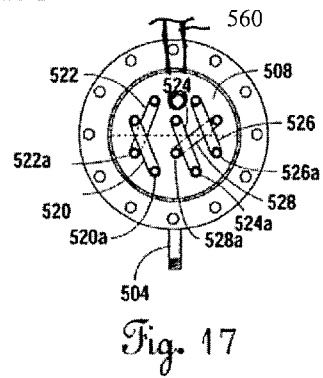
FIG. 17 is a front elevational cross-sectional view of Section 17 of FIG. 15A.

FIGS. 15A, 16, and 17 illustrate elements of Applicants' heat exchange assembly 502. Heat exchange assembly 502 may be seen to include an inlet member 504 and an outlet member 506. Inlet and outlet 504/506 are for carrying fluid A in and out of an inlet chamber 508 and an outlet chamber 510, the fluid traveling to and from buffer tank 18 in part of the secondary circuit described herein.

Inlet chamber 508 is separated from outlet chamber by dividing wall 512. Outlet chamber 510 includes dividing wall 512 and end plate 514 (which may be the manway end wall). Gasket 516 provides an inner wall for inlet chamber 508. Elements 512/514/516 all provide fluid sealing, such that inlet chamber 508 is substantially fluidly sealed from outlet chamber 510 and also fluidly sealed from housing interior 531 of housing 530. A support skid 540 may be found near the removed end of housing 530 to support it on a floor F of the OST.

Fasteners 518 may be used in conjunction with flanges to attach manway cover Mw, for example, to a manifold housing 534, which represents the side walls of both chambers 508/510. Flange 38 is adapted to receive fasteners and the manway thereon, and flange 532 of housing 530 is adapted to receive flange 536 of manifold housing 534. Manifold housing 534 engages heat exchange housing 530, which is fluidly sealed from inlet chamber 508, and contains a heat transfer medium, here designated fluid B, such as a high temperature oil or glycol, or other suitable liquid.

It is seen that there are a multiplicity of configured heat exchange tubes 520/522/524/526/528. These tubes, which may be any number, are generally shaped like an elongated U with their long legs extending through heat exchange manifold interior 531, and in contact with fluid B. Each of the multiplicity of tubes has an inlet 520a/522a/524a/526a/528a, and each inlet terminating in inlet chamber 508 and adapted to receive fluid A under pressure and carry it through the tube. There are five outlet ends, as there are five inlet ends, for each tube, outlets 520b/522b/524b/526b/528b. The outlets terminate in outlet chamber 510 as seen in FIG. 16. FIG. 17 illustrates the manner in which the inlet ends 520a-528a are configured to begin in inlet chamber.

Returning now to FIG. 15, elements of the plumbing system for carrying heat exchange fluid A to and from heat exchange assembly 502 are set forth. As can be seen from the general construction of heat exchange assembly 502, it is seen that there are an "interchange" or transfer of heat to fluid B that will receive heat from the multiplicity of configured heat exchange tubes 520-528. Fluid B will then transfer heat to the walls of typically cylindrical housing 530, the exterior of which is in contact with the fluid, substantially oil, received through 11/12/In into the interior of the various OSTs, so as to provide heat thereto. The manways are typically within one foot of the floor of the OST and therefore assembly 502 may be in the BS&W, below the oil/BS&W interface. In an alternate embodiment, the configured heat exchange tubes 520/528 are in direct contact with the separated product, that is, there is no fluid bar housing 530.

Inlet leg 542 will carry fluid A of the secondary circuit from the buffer tank to the OST. If there is more than one OST on the line, a T-junction 544 (inlet) may provide T's to other lines, here with two OSTs line or leg 542a is going to OST1 and line or leg 542b going to OST2. Moreover, it is seen that there may be check valves 554 in line 548b and check valve 556 in line 548. A proportional, mechanical or electrical flow control valve Vp as more specifically set forth below may be located at T junction 544. Outlet leg 548 carries the cooled fluid A back to buffer tank B and may have legs 548a/548b used in conjunction with outlet T 546.

It is to be understood that the fluid in the OSTs is, unlike that in the separator, generally static for extended periods of time. That is to say, while the separator is carrying fluid from the well and providing the separation process, which may or may not be assisted by Applicants' solar enhancer as set forth herein, the oil storage tanks simply fill up and await the arrival of a truck (the "gatherer") for transport to a refinery.

Thus, while OSTs may store more fluid than is found in a typical separator, that fluid may be retained in the OST for some period of time and heating it without the heat loss by removal of heated fluid (as in the separator) may be an easier job overall than a separator that carries incoming cool fluid and released warm fluid therefrom on a more or less regular basis.

Check valves 554/556 simply prevent the reversal of fluid from the directions indicated by the arrows in FIG. 15. Vp may be mechanically or electronically controlled. In either case, it may be responsive to the temperature sensors 562a/562b. When fluid A is cooled as it passes through tubes 520-528, the Vp may open to allow more to flow through and carry more heat into the heat exchange unit of the cooler OST by increasing the flow of warm fluid thereto. On the other hand, if the sensor is above a set temperature, it indicates that the fluid in the tank is warm and Vp may reduce the flow therethrough.

Manways typically provide for the removal of BS and W from the bottom of the tanks. They also provide access space for a man (thus the word "manway") for climbing into the tank when it is empty and cleaning it out. Applicants typically use the existing manway for engaging the heat exchangers to provide heat to oil storage tanks which otherwise are not heated. The warmth from Applicants' system 500 helps maintain the separation of BS and W, as separated product is received from the separator and, in a sense, provides a "final separation" at the site, by continuing the separation process. The maintenance of heat in the oil storage tank also allows the separated product to maintain a higher paraffin content, which is usually good, all while waiting for the gatherer to come and remove the stored product from the tank.

Expansion/overflow tube 560 is also provided, which may be a 1 inch pipe open at removed end 560a. Expansion/overflow pipe 560 provides for expansion of fluid in housing interior 531 and also, if there is a leakage in the wall of housing 530, it allows for the leaked fluid to be carried up tube 560 instead of, potentially, being spilled onto the ground.

Temperature sensors 562a/562b may be wired to the microprocessor/controller controller of the primary and secondary circuits as set forth herein and located within the inner volume of the one or more OSTs to provide a measure of the temperature of the product in the tank. This is then provided to the microprocessor of Applicants' computer control system to control the flow of heat exchange fluid A in the secondary circuit to provide more or less heat to the separated product stored through control of Vp. This is one manner in which the addition of heat to the separated product in the oil storage tank may be achieved, wherein Vp are electronically controlled to control heat and add heat as needed, to OST. Heat control also uses all systems used in these specifications to provide control of heat in primary, secondary, and separator/OSTs.

Applicants illustrate, in FIGS. 15-17, that a heat exchanger may be retrofitted by engagement with a manway cover and manway flange and insertion into the interior of the OST. Any of the assemblies, structures or devices illustrated with respect to engagement of a heat exchanger with the separator housing will typically work with the engagement of a heat exchanger with the walls of the OST so as to insert the heat exchanger into the interior of the OST and maintain heat in the separated oil product or to heat it even further.

Figure 18:
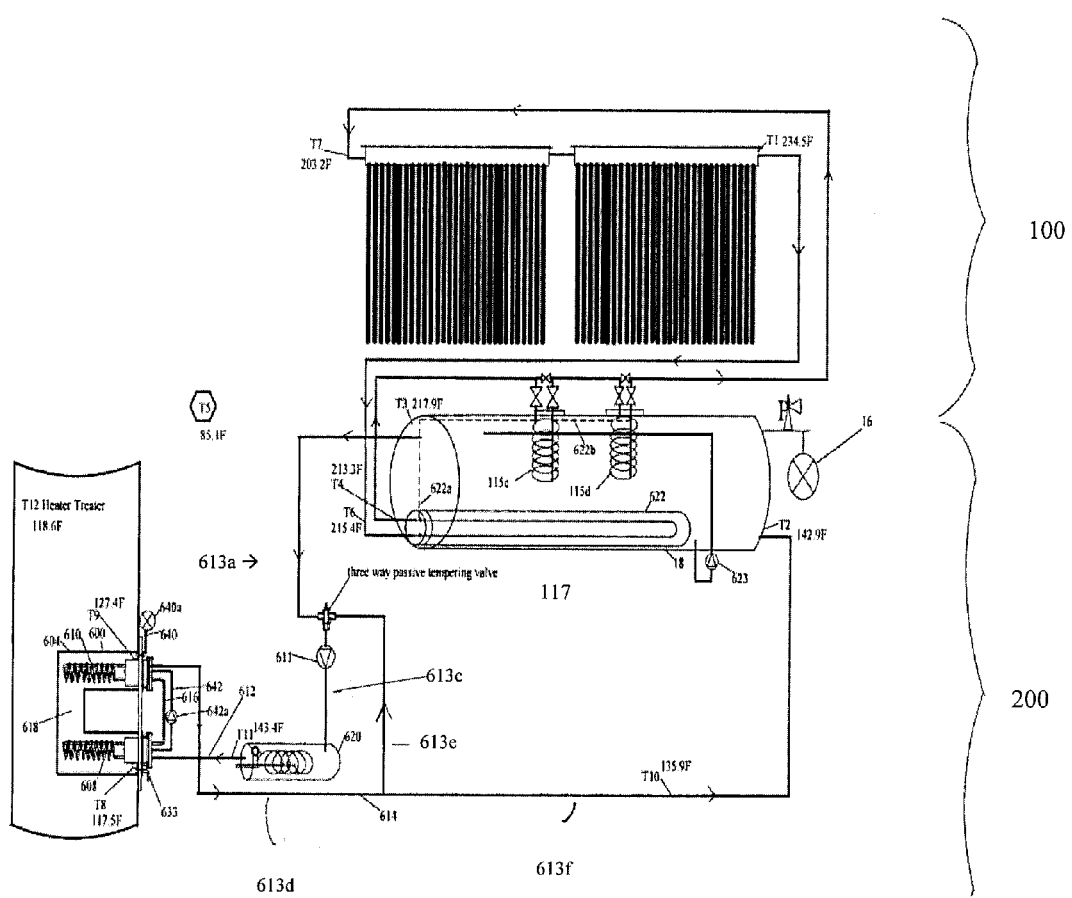
FIG. 18 is a schematic/equipment drawing showing a layout of Applicant's manner of using primary, secondary, and tertiary circuits to heat a fluid in the heater treater.

FIG. 18 is a schematic and equipment drawing of an alternate preferred embodiment of Applicant's enhanced separator system 10. In this particular application, as in some of the previous applications, a secondary heating circuit 200 includes heat exchangers that are inserted within the housing walls of a vertical heater treater. However, in the system illustrated in FIG. 18, a modified/retrofit fire tube assembly 600 is provided for insertion into the walls of the vertical heater treater utilizing an existing fire tube/flange 602 but with the gas burner and stack removed therefrom. That is to say, Applicants' modified/retrofit fire tube assembly 600 consists of a modification of an existing gas burner heater treater which uses the existing fire tube/flange, that is the existing fire tube 604 and fire tube flange cover 606 to which it is mounted—with the gas burner removed from the fire tube and the stack removed therefrom, then with the fire tube flange cover 606 modified as set forth below. However, even with the flange cover modifications, there is no cutting required on the walls of the heater treater and the modified/retrofit fire tube assembly 600 bolts onto the heater treater just as if it had a gas burner and stack. The retrofit is "invisible" with respect to the heater treater.

FIG. 18 also illustrates that the modified/retrofit fire tube assembly 600 includes upper and lower heat exchange assemblies 608/610. One of these two heat exchange assemblies (typically the lower) engage a buffer tank fluid carrying in line 612 from the buffer tank 18. A crossover line 616 carries buffer tank fluid from the lower to the other (typically upper heat exchange assembly) and a return line 614 carries the cooled buffer tank fluid back to buffer tank 18. An auxiliary electric circulating heater 620 may be provided in the in line 612 as seen in FIG. 18 and as set forth in more detail below. A pump 611 provides the fluid flow in the secondary heating circuit between the buffer tank and the heat exchange assemblies.

In one embodiment, a working fluid 618, such as glycol, receives heat from the heat exchangers 608/610 and will heat, by contact, the inner walls of fire tube 604, which outer walls are immersed in the liquid found within the heater treater. Thus, where there was once a gas burner and exhaust stack, there now resides a working fluid 618 which is heated by contact with the coils of the lower and upper heat exchange assemblies 608/610.

FIG. 18 may omit the tempering valve 117 and the bypass fluid flow pathway 210a of FIG. 5 and also the heat dissipater 110a. However, in alternate embodiments of the modified/retrofit fire tube assembly 600, any of the features of the enhanced systems may be used, including heat dissipaters and bypass/tempering valves. FIG. 18 illustrates that internal heat exchange lines 622a and 622b may be provided connecting heat exchangers 622/115c/115d instead of the external ones, unnumbered in FIG. 18. Also, a recirculation pump and circuit 623 may be used to recirculate the secondary fluid within buffer tank 18.

As in the previous embodiments, an array of temperature sensors may be provided for measuring the temperatures of various fluids at various locations and for monitoring or controlling fluid flow and/or valves responsive thereto. An example of an array of temperature sensors is illustrated in FIG. 18. More specifically, FIG. 18 illustrates temperature sensors T-1 through T#12 compositioned as generally set forth below:

T#1 Collector Temp (out)
T#2 Bottom of Buffer Tank
T#3 Top of Buffer Tank to Exchanger
T#4 Out of New Exchanger
T#5 Outside Air Temp
T#6 Into New Exchanger
T#7 Return to Collector
T#8 Bottom of Fire Tube
T#9 Top of Fire Tube
T#10 Return to Buffer Tank
T#11 Out of Buffer Tank
T#12 Heater Treater It is noted that T-5 is outside air temperature. On FIG. 18, actual measurements are shown for the array on a day when the outside air temperature is 85.1° Fahrenheit. Probe T#12 is located in what is typically the saltwater portion of the fluid in the heater treater. The sensors control the pumps as more specifically set forth herein to maintain Probe T#12, which measures the fluid inside the heater treater, between the range of 85° to 150° maximum, preferably to about 85° to about 130° and, more preferably, about 85° to about 110°. FIG. 18 shows probe T2 at the bottom of buffer tank which is typically maintained at about 250° F. minimum for a 240 gallon tank.

The function of the temperature array and the associated pumps and/or valves is to carry heat from the primary heating circuit 100 in which solar collectors collect heat from the sun and store it in a buffer tank 18 in ways set forth herein or ways known in the art. Heat from the buffer tank 18 of secondary circuit 200 is transferred to a tertiary circuit, namely the working fluid 618 found in the fire tube 604, which working fluid helps heat the walls of the fire tube which in turn heat the fluid in the heater treater. This is sometimes called a tertiary circuit and, it is noted that in the embodiment illustrated in FIG. 18, there is an optional recirculating pump 642a for providing working fluid 618 circulation between the lower and upper legs of the fire tube. However, in another embodiment, this pump is eliminated.

FIG. 18 as illustrated shows that line 612 carrying buffer tank fluid to the heat exchanger and the heat treater may be comprised of legs 613a, upstream of pump 611 and 613c, downstream of 611, and into the buffer tank. FIG. 18 also illustrates a return line 614 may be comprised of legs 613d/613f. The 613 designations are to show that, with the use of a 3-way passive tempering valve 117 upstream of pump 611, temperature control of the secondary fluid (buffer tank fluid) may be achieved. This may be achieved through the use of valve return leg 613e.

It is desired to maintain the heater treater fluid in the range of 85° to 150° maximum. When the temperature measured at T12 is in the desired range or one of the desired ranges, then all pumps are off, 611 is not pumping. If T12 calls for heat and T3 has a temperature capable of providing heat (sufficient ΔT), pump 611 turns on. The 3-way tempering valve is a passive valve and modulates return fluid with hot buffer tank fluid for a fixed temperature output. For example, if the 3-way valve 117 is set for 135° F., if the incoming fluid to the 3-way valve (leg 613a) exceeds that, then a temperature proportional amount of cooler fluid leaving the heat exchangers will come in on leg 613e.

Figure 18A:
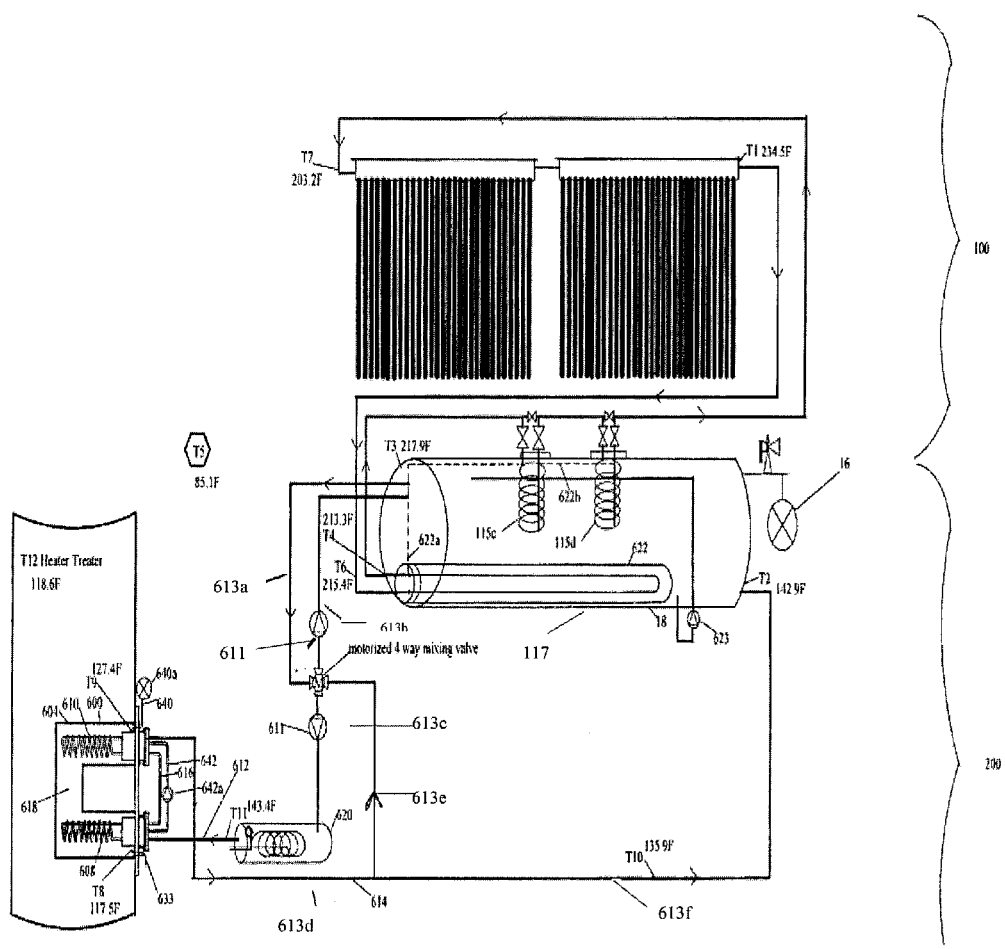
FIG. 18A is a schematic/equipment drawing of an alternate embodiment showing a layout of Applicant's manner of using primary, secondary, and tertiary circuits to heat a fluid in the heater treater.

FIG. 18A illustrates a circuit in which a motorized 4-way mixing valve 117' may be used for temperature control. If T12 calls for heat and T3 has temperature capable providing heat (sufficient ΔT), pumps 611 and 611' are turned on. The 4-way motorized valve modulates output temperature based on T12, T9 or T5 readings. 4-way valve 117 can modulate temperature in leg 613c cooling it by bringing in the fluid from line 613e and/or shunting warm fluid back through leg 613b to the buffer tank. In both the circuits illustrated in FIG. 18 (with or without valve 117) or FIG. 18A, have a condition in which, if T3 (buffer tank) is not capable of providing sufficient heat treater 620 adds additional heat to meet needs of T11-T12.

Figure 19A:
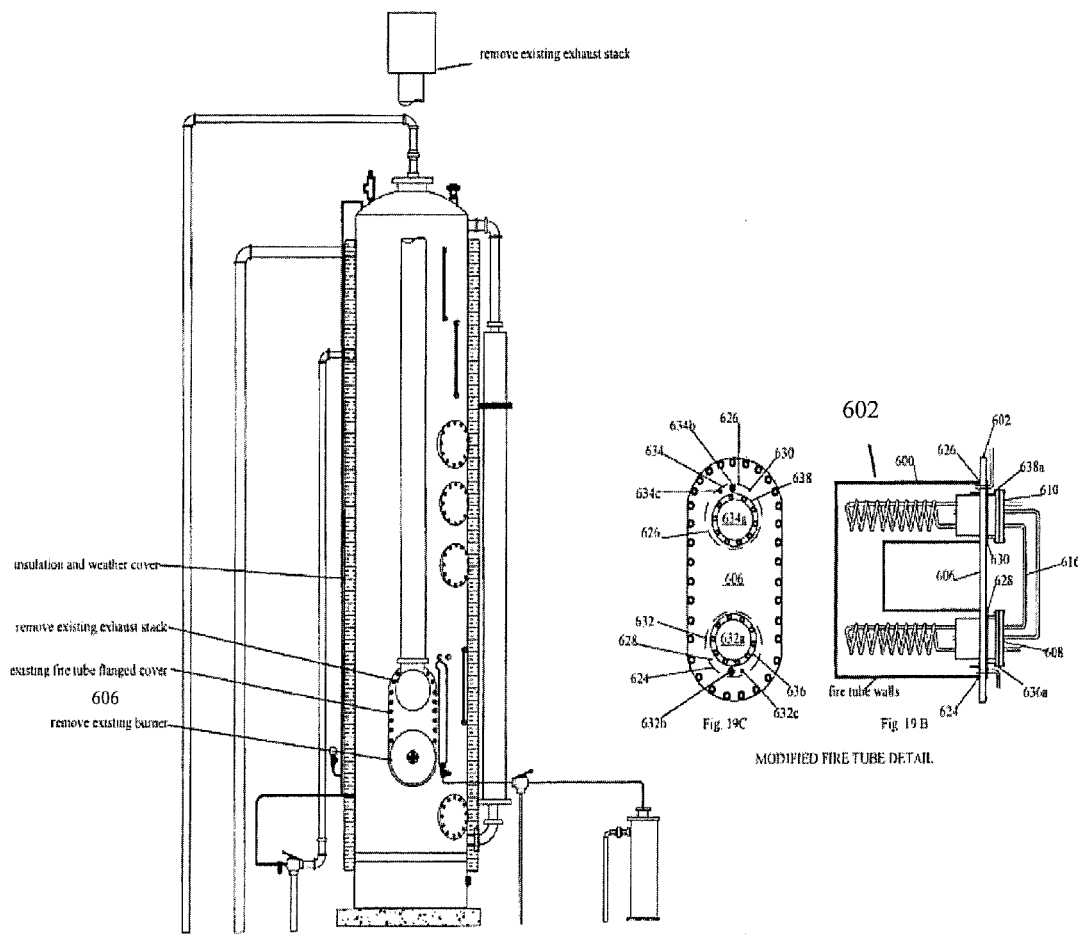
FIG. 19A is an elevational view showing a prior art heater treater except retrofitted with Applicant's secondary circuit assembly heat source.
Figure 19:
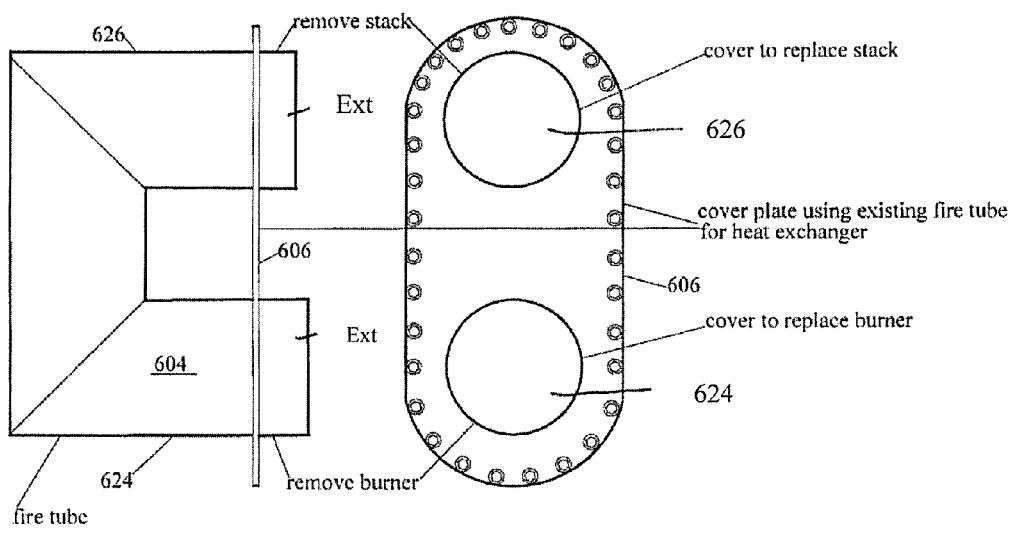
FIGS. 19B and 19C are side and front views of an assembly comprising a modified fire tube for engagement and insertion into a heater treater for heating the contents thereof.
FIGS. 19D and 19D' are detailed views, front and side, of a method of modifying a prior art fire tube stack and burner assembly so that it utilizes elements of Applicant's retrofit to engage the interior of the heater treater and heat the fluid therein.
FIGS. 19E and 19E' are front and side partial views of the modified fire tube assembly for use with a heater treater.
FIGS. 19F and 19G are side and front views of the modified fire tube with Applicant's assembly defined at least in part by some of the elements shown thereon, for transferring heat to the contents of a heater treater.
FIGS. 19H and 19I are side elevational views that illustrate a heater treater engaging Applicant's assembly for heating the fluid there within.
FIGS. 19J and 19K are front and front/side elevational views of an alternate assembly for engaging the secondary circuit to the interior of a heater treater or other suitable device to heat the oil product therein.
Figure 19:
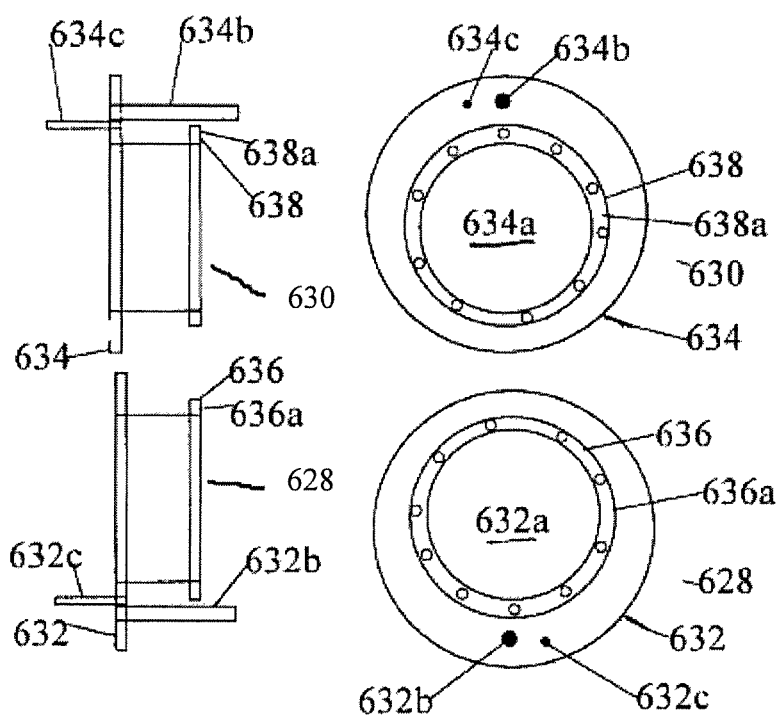
Figure 19:
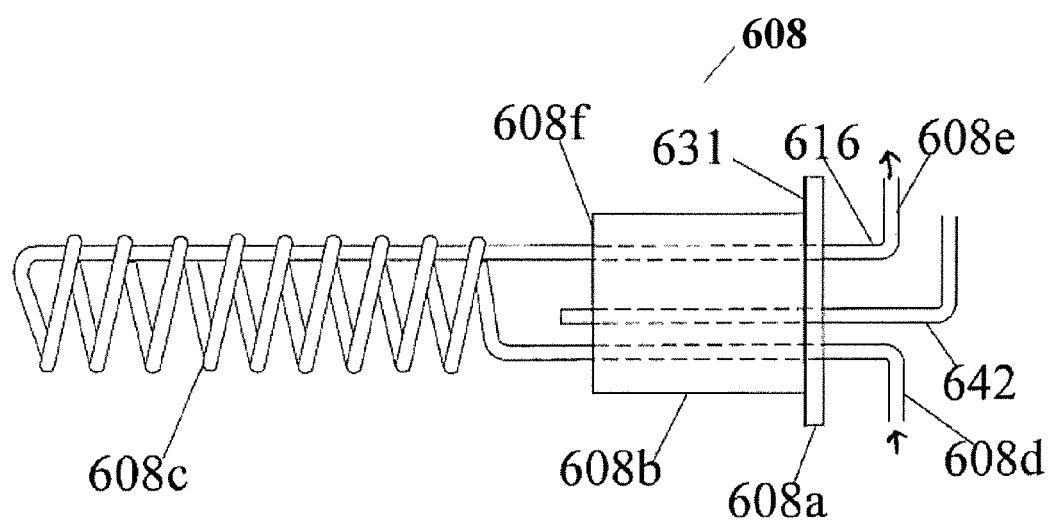
Figure 19:
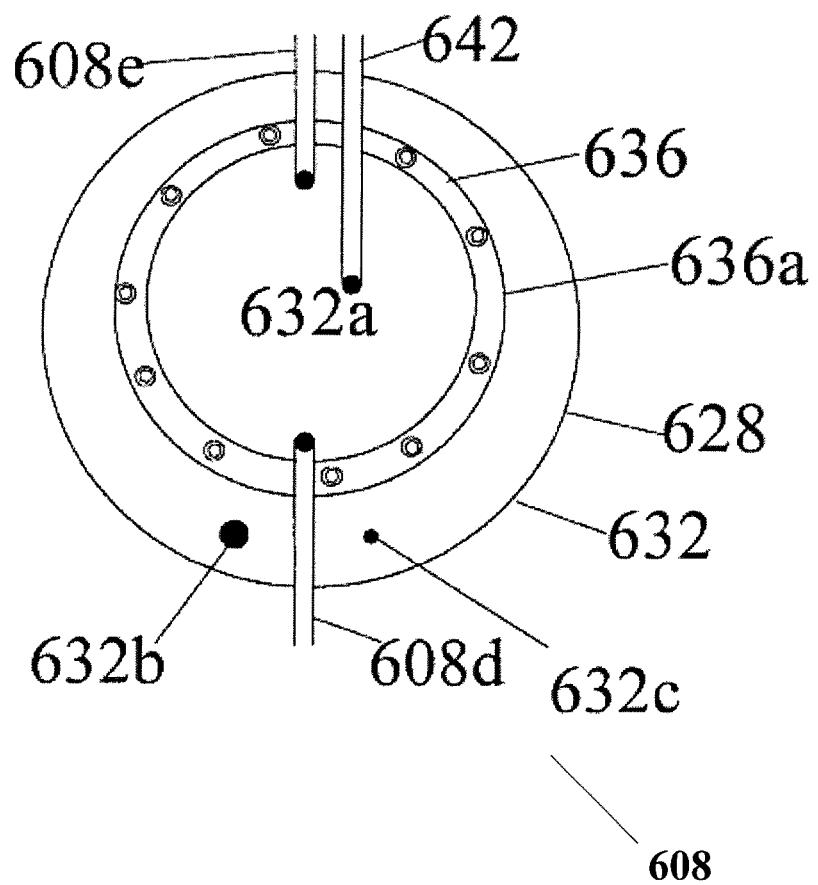

FIGS. 19A-19H illustrate the removal and modification of the existing fire tube/flange 602. FIG. 19A illustrates heater treater before the removal of the existing burner and shows the existing fire tube/flanged cover 606 with a bolt pattern will remain intact but which fire tube flange cover will be modified as set forth below. FIG. 19A also illustrates heater treater before removal of the existing fire tube exhaust stack. The removal of the existing burner may be through the use of hand tools and a cutting torch and the removal of the existing stack may be done in the same manner. Turning to FIGS. 19D and 19D', fire tube 604 and fire tube flange cover 606 are seen after removal of the exhaust stack and the existing burner and after being unbolted and removed from the heater treater. It is seen that extensions Ext will be cut off where they meet flange 606. When the extensions Ext in FIG. 19 are cut off flush to flange 606, the removal will leave fire tube flange cover 606 flat with lower fire tube opening 624 and upper fire tube openings 626 (see FIGS. 19C, 19D). It is at this point additional structure is added to create modified/retrofit fire tube assembly.

Turning now to FIGS. 19C, 19D, 19D', 19E, and 19E' upper cover plate assemblies 628 and 630 may be seen to comprise cover plates 632 and 634 which are sized slightly larger than fire tube openings 624/626 and will be placed over those openings and welded in a fluid-tight matter around the perimeter thereof. Cover plate assemblies 628/630 are also seen to have, upstanding and directed outward from the top surface thereof, heat exchange couplers 636/638. Cover plates 632/634 have cutouts 632a and 634a, typically offset, therethrough as seen in FIGS. 19C and 19E'. Cover plates 632/634 are also seen to include tertiary working fluid ports 632b and 634b to provide access to and filling working fluid 618 inside fire tube 602. Port 632b may be used to fill fire tube 604 with working fluid 618. Port 634b will allow overflow when filling and may engage expansion tube assembly 640 (see FIG. 18) to allow for expansion and overflow of working fluid 618. Cutouts 632a and 634a will allow the couplings of upper and lower heat exchange assemblies 608/610 to flanges 636a/638a of cover plate assemblies 628/630 in a fluid-type manner, such that the coils of the heat exchange assemblies project into the upper and lower legs of the fire tube 604 and the working fluid 618 as seen in FIG. 18. Temperature sensor ports 632c/634c may be provided in the upper area of cover plates 632/634 (the top cover plate) for insertion of temperature probes T-8 and T-9 into the interior of the fire tube to measure the temperature of working fluid 618.

FIGS. 19F and 19G illustrate lower heat exchange assembly 608 having cylindrical body 608b, with a flange 608a on a removed end thereof. Flange 608a has bolt holes and is intended to mate with flange 636a (see FIG. 19E) and a gasket 631 as seen in FIG. 19F may go therebetween. Body 608b will slide through cover plate opening 632a. Coil 608c, such as flexible copper tubing, is connected to sealed end 608f by in-tube 608d and out-tube 608e. Out-tube 608e will engage crossover line 616 to engage similarly constructed upper heat exchange assembly 610 which will be inserted through cover plate opening 634a.

FIGS. 19E', 19F, 19G, and 19H, in conjunction with FIG. 18, will provide further details of Applicants' fire tube assembly 600. More specifically, it is seen that in tube 608d in FIG. 19G, carries fluid in from the inline 612 to coil 608c. Out tube 608e is connected to crossover line 616 (see FIG. 18). Working fluid crossover line 642 (see FIGS. 18, 19F, 19G) may be provided to assist in the circulation of working fluid in the fire tube 604. In FIGS. 19E and 19G, temperature sensor port 632c is seen for insertion of the lower temperature probe T-8 into the bottom of the fire tube as also seen in FIG. 18. A drain fill line 633 (see FIG. 18) is illustrated engaged to port 632b to help fill the interior of the fire tube with working fluid 618. In the fill process, the working fluid will fill the interior of the fire tube until the fluid exits port 634b and fills at least part of the expansion tube assembly 640. A vent may be provided also in expansion tube assembly 640 to handle any possible overpressure situation.

Figure 19H:
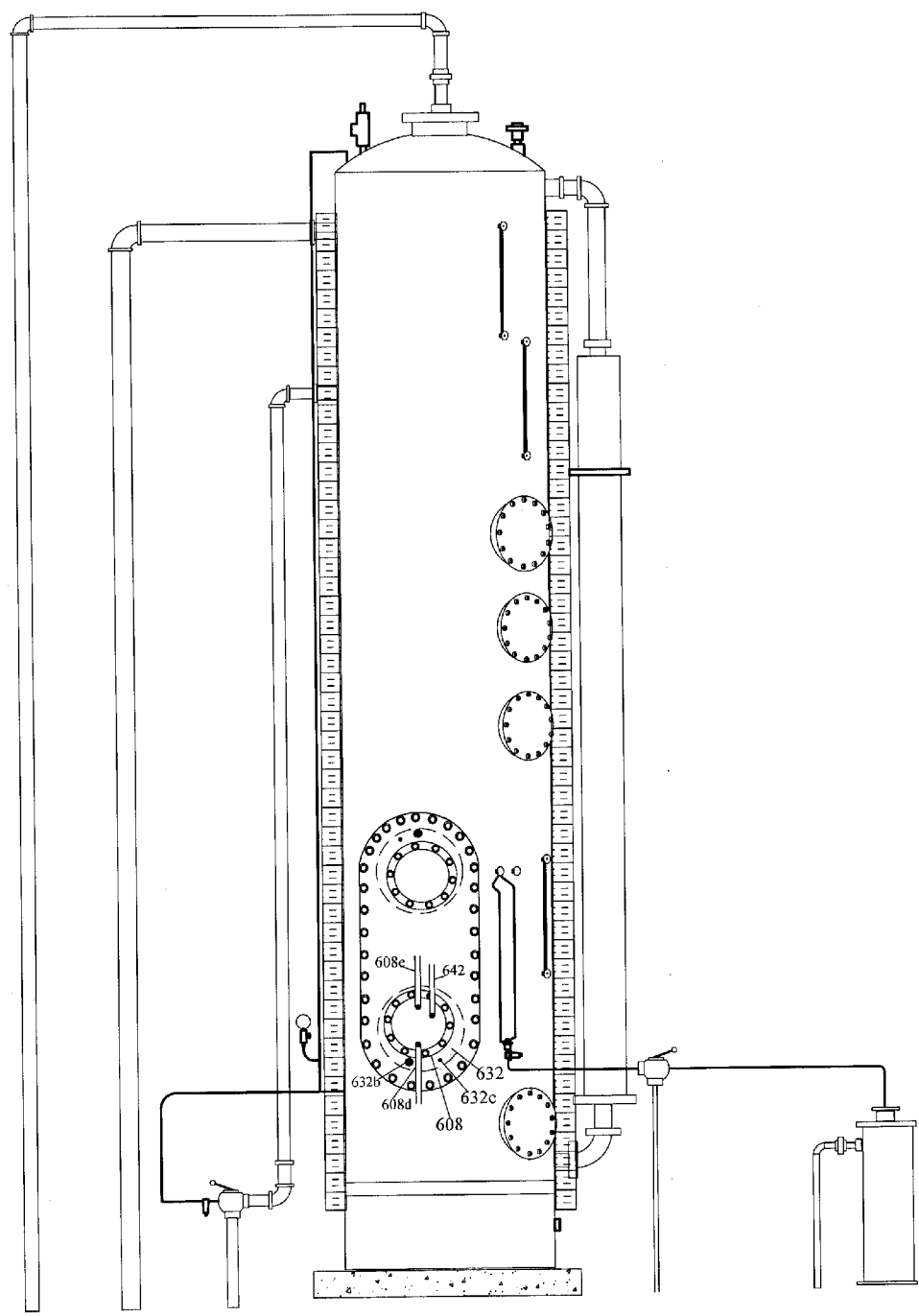
Figure 19:
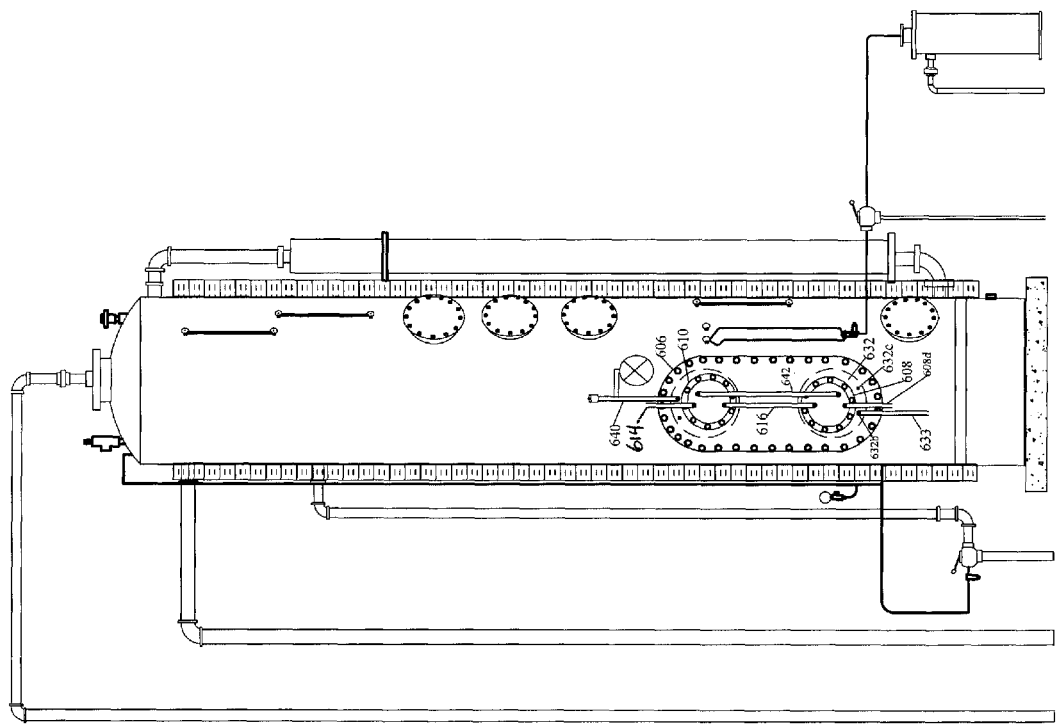
Figure 19:
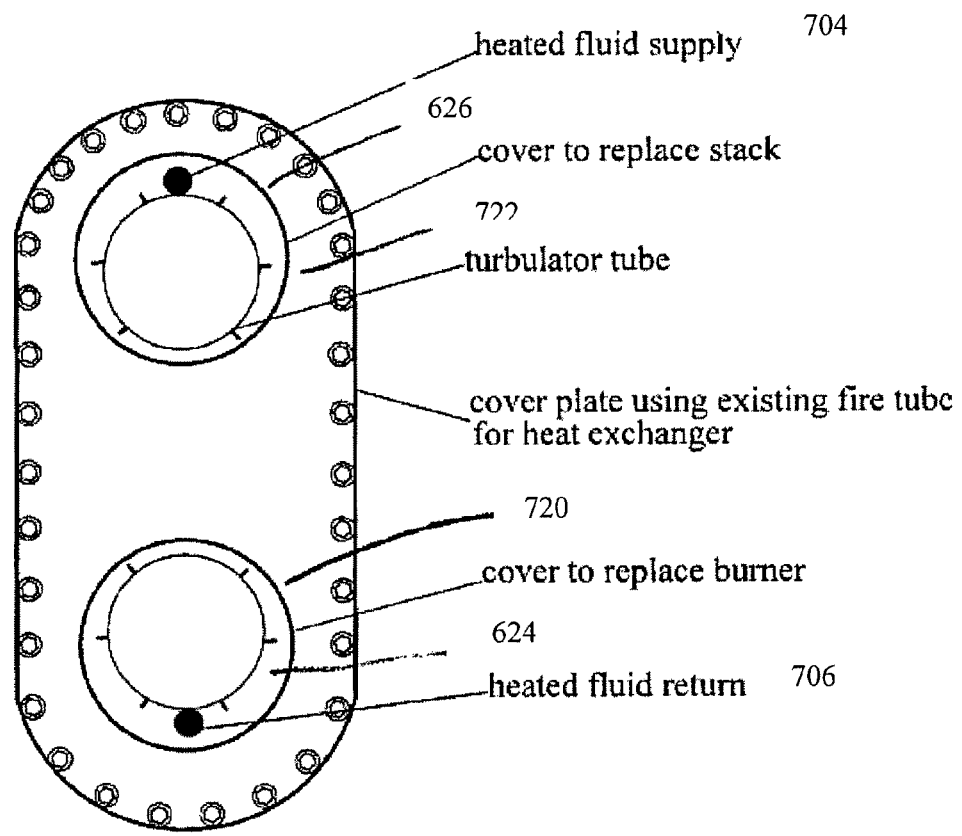
Figure 19:
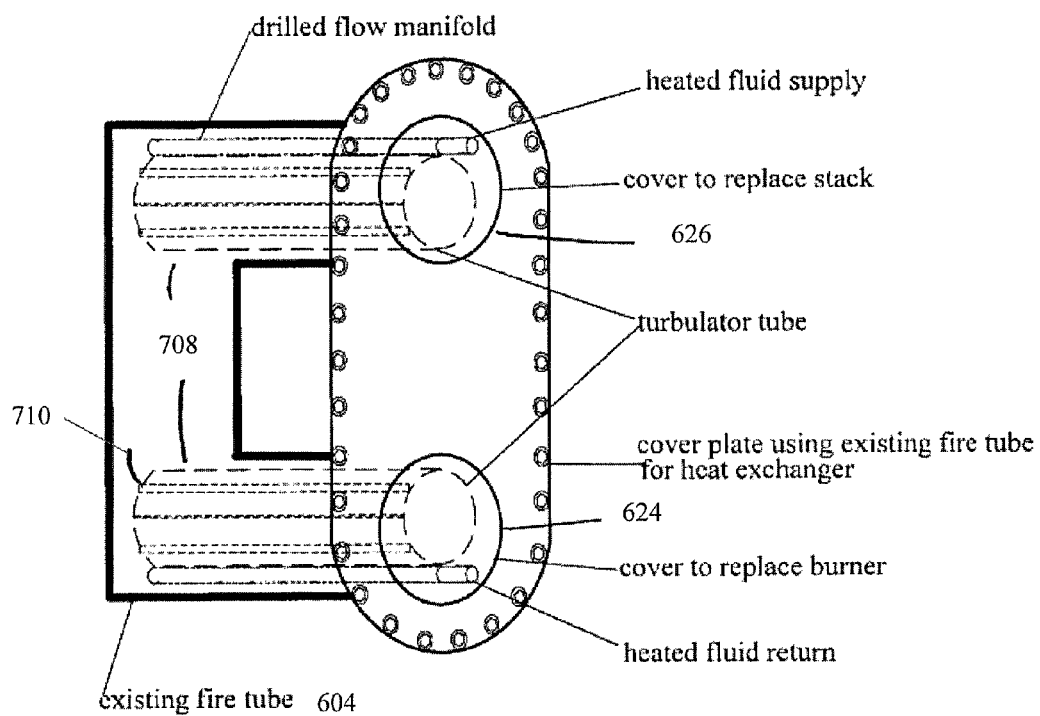
Figure 20A:
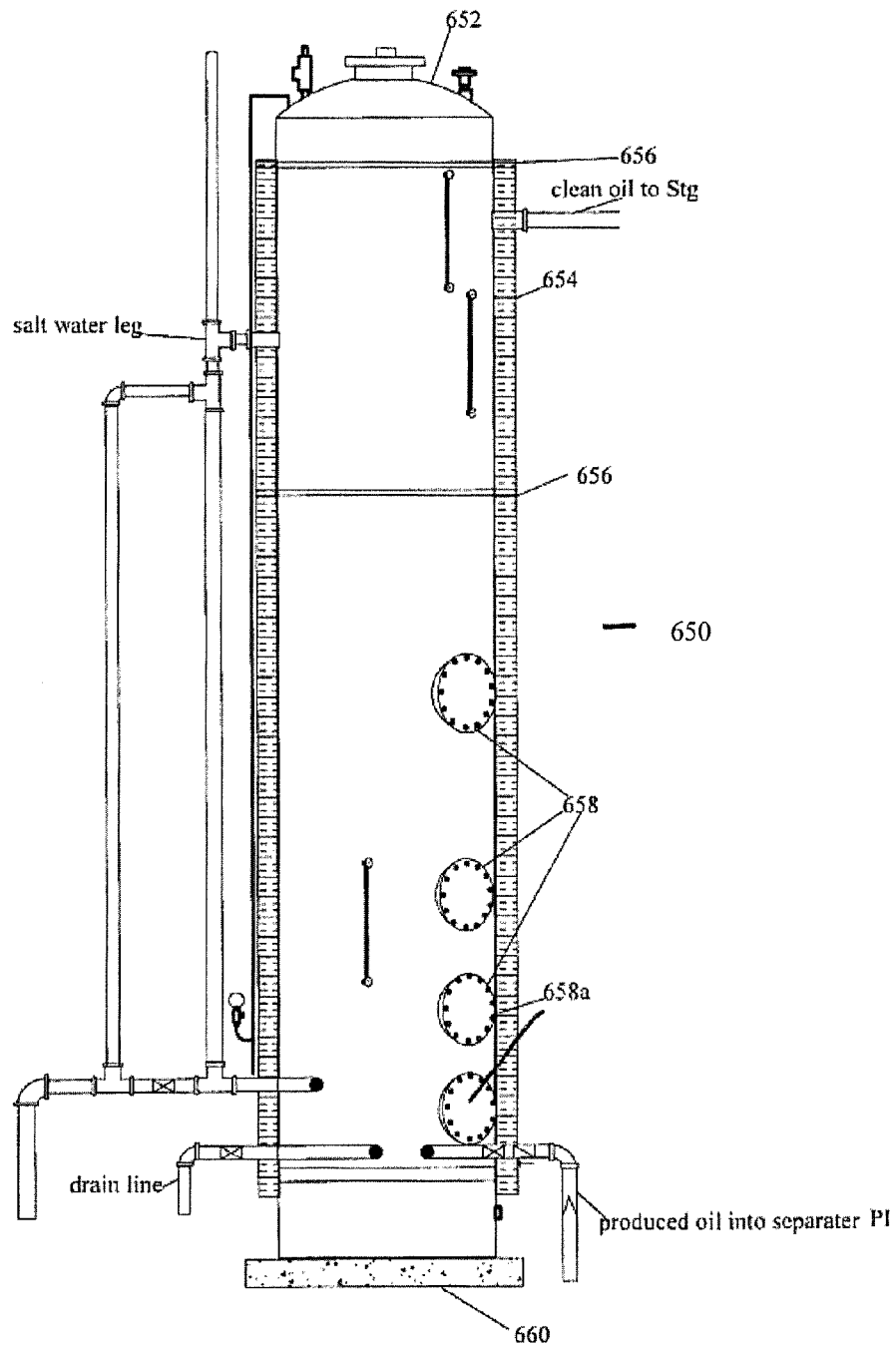
FIG. 20A illustrates a prior art fiberglass separator (heater treater) showing the manways.

FIG. 19H illustrates the installation of lower heat exchange assembly 608 onto the heater treater. Tubes 608d and 608e may be seen, as well as working fluid crossover 642. Moreover, it is seen how flange 608a mates with flange 636a. FIG. 19I shows the completed heat exchange assemblies 608/610 installed and retrofitted on the heater treater. Fire tube flange cover 606 is seen to engage the heater treater, but with the fire tube modified as set forth herein. Drain/fill line 633 is shown for filling the fire tube with working fluid 618. Working fluid crossover 642, as well as crossover line 616, are illustrated. Return line 614 is also illustrated.

FIGS. 19J and 19K illustrate alternate embodiments of a fire tube retrofit, which provides buffer tank fluid to the modified fire tube. That is to say, FIGS. 19J and 19K are simplified as they do not use a tertiary circuit. The existing fire tube is removed as in the previous embodiment and the stack and burner removed. But now lower and upper fire tube openings 624/626 are covered with lower and upper 720/722 plates, which have heated fluid supply 704 and heated fluid return 706 ports for engaging supply line from the buffer tank and return line to the buffer tank in ways set forth herein. Pump 611 will provide impetus for driving the fluid through fire tube 604. One or more turbulators 708 may extend inward from cover plates 720/722. They may be cylindrical with fins 710 or other projections on the exterior thereof, so as to help mix up the buffer tank fluid as it circulates between supply 704 and return 706.

Whereas, the FIG. 19 Series fire tube retrofit is illustrate above, FIGS. 20A-20D illustrate a retrofit modification of heat exchangers for carrying heat from a buffer tank to an existing fiberglass separator 650, as known in the art. Moreover, where the retrofit embodiment illustrated in the FIG. 19 Series with fire tube assembly illustrates the removal of one source of heat (natural gas) and the insertion of Applicant's heat exchanger heated from the buffer tank, the retrofit application with fiberglass separators 650 is more akin to the description above with respect to FIGS. 15, 15A, 16, and 17 illustrating heating of oil in an oil storage tank. That is to say, oil storage tanks have been heretofore used just for that—storage of oil that has been removed from a separator that has separated out the water and other components, with Applicant's use of the heat exchanges engaged therewith. However, existing fiberglass separators are presently used that simply allow ambient heat and the impetus of gravity to separate the product going into the separator here in FIG. 20A Pi (product in). These simply let the product from the well to separate out without adding heat with the clean oil going to oil storage tanks.

It Is seen that the existing fiberglass separators have an extended longitudinal axis to enhance "natural" separation. What Applicants provide is the fitting of fiberglass separators with heat exchangers substantially similar to those set forth in FIGS. 15, 15A, 16, and 17, as well as those in the FIG. 19 Series retrofit. More specifically, it is seen that Applicants provide a vertical fiberglass oil and gas separator 650, such as one approximately four feet in diameter and twenty feet high, and available in the prior art, with certain modifications as set forth below. These prior art vertical fiberglass separators typically have an shell 652 made of fiberglass, including about ⅜-½ inch fiberglass. Being fiberglass instead of steel, the $H_2S$ and other harmful chemicals, which may corrode a steel tank, are largely ineffective. Applicants typically provide the vertical fiberglass oil and gas separators with an insulation member 654 and one or more heat exchange assemblies 665 for insertion, typically, into existing manways 658 of the fiberglass separator. The heat exchanger 655 are dimensioned to engage existing flanges on the fiberglass separator that are there after removal of manway cover 658a. The construction and fluid circuits of heat exchanger 655 are substantially the same as those disclosed with respect to the oil storage tank and the fire tube retrofit. That is to say, they are dimensioned so they fit within the existing manway opening and have fabricated covers 659 that will engage, with fasteners or the like, the existing flanges of the fiberglass separator.

Thus, Applicants retrofit an existing fiberglass separator that is provided without heat means, but uses primary circuit, secondary circuit buffer tank with optionally auxiliary electric heater upstream of the heat exchanger or exchangers and downstream of the buffer tank, as seen in FIG. 18, for example. Typically, glycol will not be used as a secondary or tertiary fluid as it may be corrosive to fiberglass. Shaeffer 1034 may be used in any of the applications set forth in these specifications as a heat transfer fluid.

FIGS. 20B and 20C illustrate the similarity in construction of the previously described heat exchangers, here having a housing 662 dimensioned for insertion into the interior of the fiberglass separator, which housing may be cylindrical and about 35 inches long to 10 inches in diameter and made of stainless steel. Inside housing 662 is a working fluid 664, which transmits heat from coil 666 to the fluid in the interior of the fiberglass separator to assist in the separation of the fluid into water and other components and clean oil. Clean oil Co may then be drawn off in ways known in the art for storage at oil storage tanks Stg onsite for later pickup. As in the earlier embodiments, coils 656, while typically transferring heat to a working fluid in housing 662, may be used without housing 662, such that there is no tertiary circuit and the fluid in the coils (secondary circuit) heats the coils, which in turn heats the fluid in the interior of the fiberglass separator by contact (see, for example, FIG. 20C). The fiberglass separator may sit on a support pad 660, such as a cylindrical concrete pad placed on the ground.

Turning back to insulation member 654, in one embodiment, it comprises about 1½-3-inch-thick pressed fiberglass, which may have an aluminum sheet backing (on the outside) and may be cut into 2 by 4 foot strips. These 2 by 4 foot strips may be taped where they lay adjacent to each other and placed on the exterior of shell 652. They may be retained in place with a multiplicity of fabricated steel bands 656. In one embodiment, "double bubble" is used between the fiberglass insulation and the exterior of the heater treater.

FIGS. 21A-21E illustrate a manner in which elements of Applicants' disclosure may be configured into a modular unit 270 for use at remote locations or for disaster relief or other suitable purposes. In this embodiment, a modular solar thermal unit, which defines a primary circuit 674 as set forth herein, is provided. Buffer tank and heat exchangers defining a secondary circuit 676 are provided as set forth herein. Controls and pumps 678 are provided to control the flow of fluids in the primary and secondary circuits. Photoelectric/wind or other off grid auxiliary electric source 680 is provided. Primary, secondary circuits, pumps and controls and auxiliary power source 680 are typically in a box and/or trailer 672, which allows for the modular nature—that is, the transportation of the structural elements 674/676/678/680 to a remote location with delivery via land, sea or air. Suitable box structures or frame and trailer for land delivery may be provided in ways known in the art.

Looking at FIGS. 20D and 20E, it is seen that similar assemblies may be provided for insertion into the manways of either storage tank or a heater treater. FIGS. 20D and 20E illustrate the use of the primary circuit (buffer tank) working fluid to directly contact the inner surface of the cylindrical outer walls of the assembly (the outer surface of these walls being in contact with the produced oil or other fluid in the separator). A cylindrical, hollow, open-ended "ribbed" turbulator may be provided. In FIG. 20D, supply and return ports/tubes bring in the working fluid into the outer cylinder outside of the turbulator, in FIG. 20E supply and return B inside the hollow turbulator. Any suitable arrangement may be used.

Figure 21:
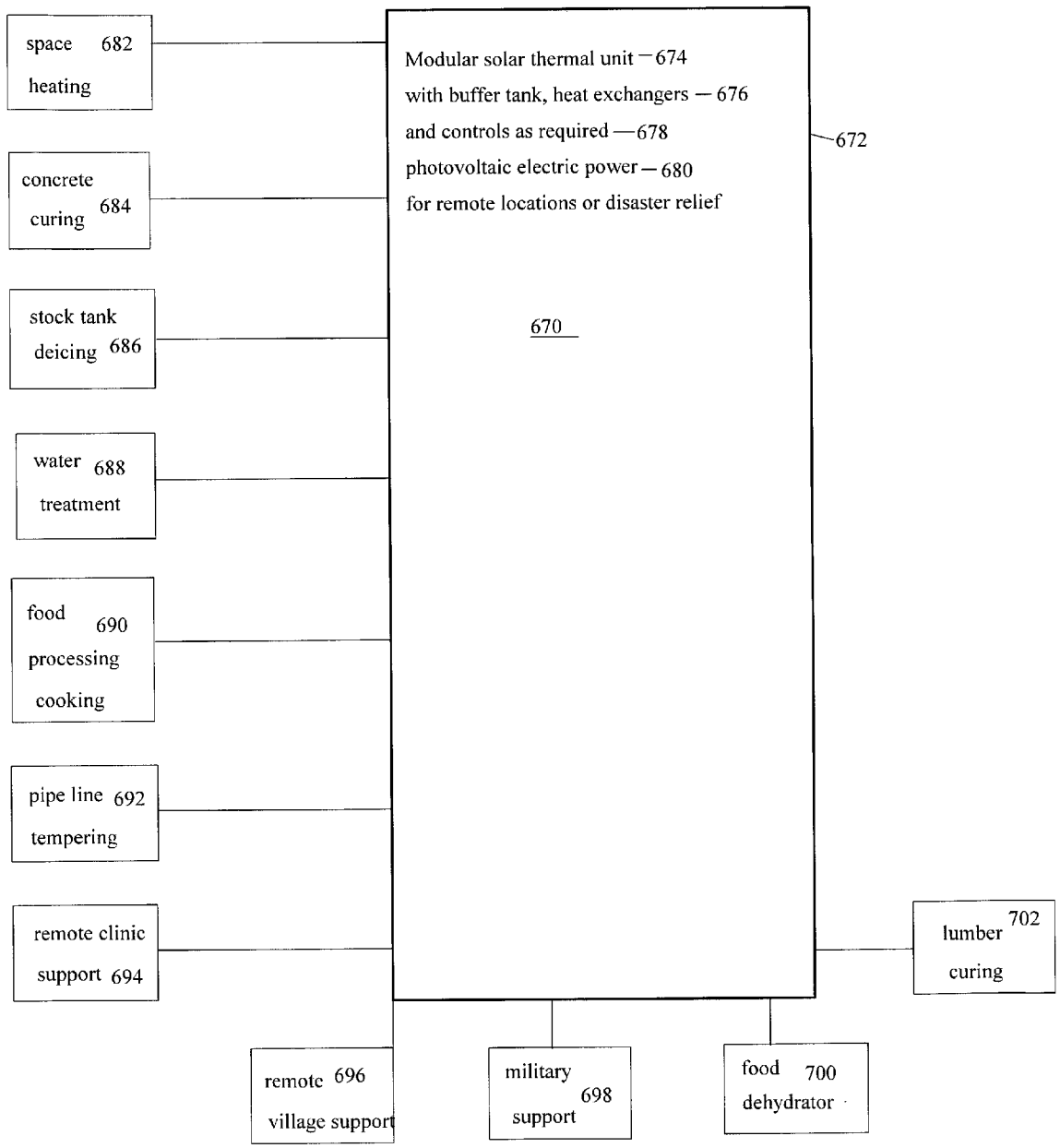
FIG. 21A is a diagrammatic illustration showing the multiple use environments for Applicant's modular solar thermal unit with buffer tank engagement (primary circuit) and the use (optionally) with the secondary circuit in a number of environments (heat loads), as well as illustrating the photovoltaic electric power and other supplemental means of electric power for use at remote locations or disaster relief.
FIGS. 21B, 21C, 21D, and 21E illustrate various modular assemblies of Applicant's primary and secondary circuit for use at remote locations or disaster relief.

Element numerals 672-702 in FIG. 21A illustrate possible uses of heat from insulated buffer tanks 682/684 of the secondary circuit mounted within a container or on a trailer or other trailer/box modular combination 672.

FIGS. 21B-21E illustrate that a solar array 686, which may be evacuated U-tube solar collectors (multiple panels or other suitable collector designs) may be configured to both fit within a container or on a trailer and also may be mounted to the support surface represented by the trailer/container or other combination. For example, FIGS. 21B-21E represent a shipping container as known in the art typically having dimensions of about 8' wide by about 8' high by 20-40-plus feet long, and having durable steel walls (or any standard sized or custom sized shipping container). Here, the shipping container is used to both contain the solar array 686, either in broken down form or as fully assembled (see area for packing and shipping solar collectors and other optional equipment, FIG. 21C). Mounting apparatus 688 may be provided and may be manual or motorized. Such mounting apparatus 688 may mount the solar array 686 at a predetermined angle, so as to provide the most efficient heating for the fluid in the primary and secondary circuits. In one embodiment, hinge 690 is provided as part of mounting apparatus 688. In a motorized version, an electric motor may be used to shift the angle of the solar array with respect to the support structure on which it is mounted so as to face the surface.

FIG. 21B also illustrates the use of photovoltaic panel 692 that may also be mounted to a support surface, such as trailer/box 672 in the same or similar manner, and used to provide auxiliary unit 680 with electricity. FIG. 21C illustrates that the shipping container embodiment may be internally divided into buffer tank areas 672a, here having two buffer tanks 682/684, and another area 672b for remaining elements 672b. FIGS. 21D and 21E illustrate heat exchanger or other load 694, which receives heat from the heated fluid in the buffer tank (secondary circuit). A circulator 696 or other pump may be provided as well as a tempering valve 698. Tempering valve 698 acts as other tempering valves set forth herein to shunt some or all of the flow through heat exchanger or other load 694 responsive to temperature. The pump or circulator 696 may be energized through Applicants' auxiliary electrical system 680.

Figure 22:
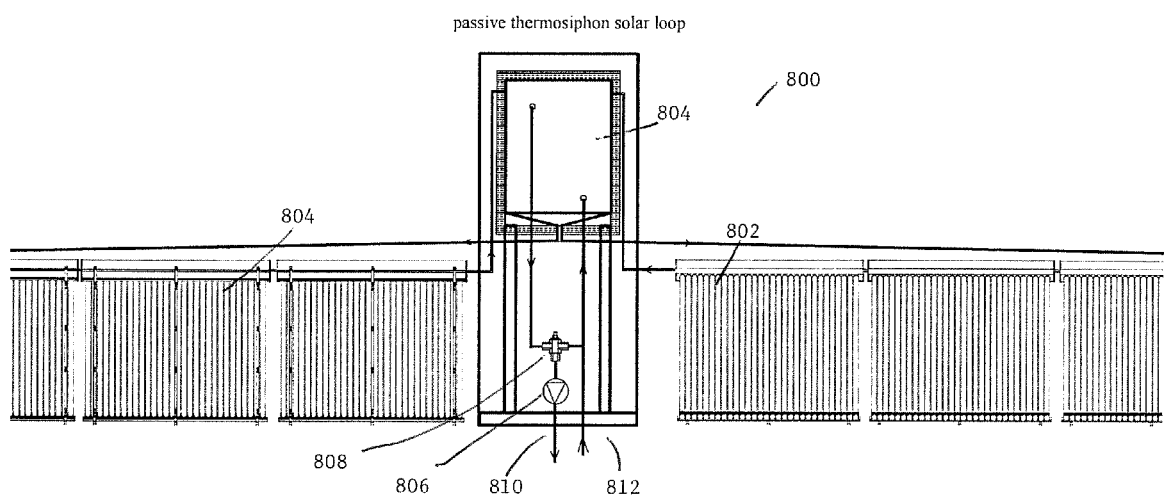
FIG. 22 illustrates a novel passive thermalsiphon and solar loop in elevational view for multiple uses with a heat receiving load.

FIG. 22 illustrates a passive thermosiphon loop 800 that achieves passive thermosiphon mixing of fluid in buffer tank 804 with solar panels 802 without the necessity of pumps. Passive solar loop 800 may include multiple solar panels 802. These may be fixed or moveable as on a carousel or the like. The solar collectors may be mounted vertically or with a manual or motorized seasonal/daily tracking mechanisms as known in the art. The solar panels may be vertically mounted and fixed and utilized as a privacy or noise abatement fence surrounding all or part of Applicant's devices set forth herein, or other location equipment. Such placement will allow the solar collectors or collectors to be mounted around the perimeter of location and reduce the footprint of a well pad site, for example.

Buffer tank 804 may be elevated and insulated to enhance thermosiphon with the solar panels. An out and return loop to a load, such as a vertical treater heater, OST or any other load (requiring heat) may include a 3-way valve and recirculation as set forth hereinabove (see FIGS. 18 and 18A). Pump 806 is provided for out and return of the buffer tank fluid, to the load, and returning from the load. The 3-way 808 may be used to temper the heat going to the load as set forth in these specifications.

While retrofit of any assembly comprising secondary and secondary plus tertiary fluid for heating (or assisting the heating) of OST, separators or heater treaters are shown, it is to be understood that the walls of any of these may be modified or in manufacture of new devices, may be made to include the heating assemblies and devices disclosed herein.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. A device for heating product at an oil well site to assist the separation or the maintenance of separation of the oil product into at least clean oil, water, and gas components, the device comprising:
   a heater treater including a housing, the housing defining a heater treater interior, the heater treater including a fire tube access opening, the heater treater adapted to receive oil well product in the interior thereof;
   a primary circuit, the primary circuit including a solar panel, a first non-water, liquid heat transfer medium chosen to maintain a liquid state in the circuit, and a primary/secondary circuit heat exchanger, a primary circuit pump, and a first fluid flow pathway, the pump for engaging the first fluid flow pathway for circulating the first non-water, liquid heat transfer medium between the solar panel and the primary/secondary circuit heat exchanger;
   a secondary circuit comprising a buffer tank adapted to receive the primary/secondary heat exchanger, a second non-water, liquid heat transfer medium, a secondary circuit pump adapted to pump the second heat non-water, liquid transfer medium chosen to maintain a liquid state in the circuit therethrough, an outlet pipe engaging the buffer tank, and an inlet pipe engaging the buffer tank;
   an assembly engaging the fire tube access opening with the secondary circuit for heating the oil product within the heater treater;
      wherein the secondary circuit pump circulates the second heat transfer medium through the buffer tank, the outlet pipe, and the assembly engaging the fire tube access opening, to transfer heat to the interior of the heater treater; and
      wherein the heater treater includes a fire tube that was intended to burn a fuel in the fire tube, for engaging the access opening
      wherein the fire tube includes open ends and wherein the assembly includes plates to fluidly seal to the fire tube so the second heat transfer medium may circulate through the fire tube so that the second heat transfer medium directly contacts the inner walls of the fire tube.

2. The device of claim 1, wherein the assembly includes a turbulator.

3. The device of claim 1, wherein the assembly further includes an electric heater located so as to provide heat to second heat transfer medium after leaving the buffer tank.

4. The device of claim 1, further including a temperature control valve between the buffer tank and the plates to control the temperature of the second heat transfer medium.

5. The device of claim 1, further including temperature sensors engaging the secondary circuit and the interior of the heater treater.

6. The device of claim 1, further including an expansion tank engaging the fire tube.

* * * * *